United States Patent
Wu et al.

(10) Patent No.: US 11,482,725 B2
(45) Date of Patent: Oct. 25, 2022

(54) ELECTRODE AND LITHIUM-ION BATTERY EMPLOYING THE SAME

(71) Applicant: INDUSTRIAL TECHNOLOGY RESEARCH INSTITUTE, Hsinchu (TW)

(72) Inventors: Wei-Hsin Wu, Hsinchu (TW); Chih-Ching Chang, Hsinchu (TW); Yu Fang Huang, Puli Township (TW); Li-Ju Chen, Hsinchu (TW); Chia-Chen Fang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 163 days.

(21) Appl. No.: 17/125,004

(22) Filed: Dec. 17, 2020

(65) Prior Publication Data
US 2021/0210745 A1    Jul. 8, 2021

Related U.S. Application Data

(60) Provisional application No. 62/949,934, filed on Dec. 18, 2019.

(51) Int. Cl.
*H01M 10/0562* (2010.01)
*H01M 10/0525* (2010.01)
(Continued)

(52) U.S. Cl.
CPC ....... *H01M 10/0562* (2013.01); *H01M 4/134* (2013.01); *H01M 4/366* (2013.01);
(Continued)

(58) Field of Classification Search
CPC ...... H01M 4/134; H01M 4/366; H01M 4/382; H01M 4/62; H01M 4/624; H01M 4/661;
(Continued)

(56) References Cited

U.S. PATENT DOCUMENTS

| 5,427,875 A | 6/1995 | Yamamoto et al. |
| 5,858,264 A | 1/1999 | Ichino et al. |

(Continued)

FOREIGN PATENT DOCUMENTS

| CN | 105552316 A | 5/2016 |
| CN | 106898811 A | 6/2017 |

(Continued)

OTHER PUBLICATIONS

Taiwanese Office Action and Search Report for Taiwanese Application No. 109144657, dated May 21, 2021.
(Continued)

*Primary Examiner* — Matthew J Merkling
(74) *Attorney, Agent, or Firm* — Birch, Stewart, Kolasch & Birch, LLP

(57) ABSTRACT

An electrode and a lithium-ion battery employing the electrode are provided. The electrode includes an active layer, a conductive layer, and a non-conductive layer. The conductive layer is disposed on the top surface of the active layer. The conductive layer includes a first porous film and a conductive lithiophilic material, and the conductive lithiophilic material is within the first porous film and covers the inner surface of the first porous film. The non-conductive layer includes a second porous film and a non-conductive lithiophilic material, and the non-conductive lithiophilic material is within the second porous film and covers the inner surface of the second porous film. The conductive layer is disposed between the active layer and the non-conductive layer. The binding energy (ΔG) of the lithiophilic material with lithium is less than or equal to −2.6 eV.

20 Claims, 11 Drawing Sheets

(51) Int. Cl.
*H01M 4/62* (2006.01)
*H01M 4/36* (2006.01)
*H01M 10/0566* (2010.01)
*H01M 4/134* (2010.01)
*H01M 4/38* (2006.01)
*H01M 4/66* (2006.01)
*H01M 10/056* (2010.01)
*H01M 4/02* (2006.01)

(52) U.S. Cl.
CPC .............. *H01M 4/382* (2013.01); *H01M 4/62* (2013.01); *H01M 4/624* (2013.01); *H01M 4/661* (2013.01); *H01M 10/056* (2013.01); *H01M 10/0525* (2013.01); *H01M 10/0566* (2013.01); *H01M 2004/021* (2013.01); *H01M 2004/027* (2013.01); *H01M 2300/0037* (2013.01); *H01M 2300/0071* (2013.01); *H01M 2300/0082* (2013.01); *H01M 2300/0091* (2013.01); *H01M 2300/0094* (2013.01)

(58) Field of Classification Search
CPC ........... H01M 10/0525; H01M 10/056; H01M 10/0566; H01M 2004/021; H01M 2004/027; H01M 2004/0037; H01M 2004/0071; H01M 2004/0082; H01M 2004/0091; H01M 2004/0094
See application file for complete search history.

(56) References Cited

U.S. PATENT DOCUMENTS

| | | | |
|---|---|---|---|
| 8,227,105 | B1 | 7/2012 | Gerald, II et al. |
| 9,368,775 | B2 | 6/2016 | Visco et al. |
| 9,379,368 | B2 | 6/2016 | Roumi |
| 10,069,135 | B2 | 9/2018 | Fleischmann et al. |
| 10,164,297 | B2 | 12/2018 | Fanous et al. |
| 10,205,155 | B2 | 2/2019 | Holme |
| 10,347,904 | B2 | 7/2019 | Cho et al. |
| 10,411,257 | B2 | 9/2019 | Chang et al. |
| 10,454,112 | B2 | 10/2019 | Wu et al. |
| 2005/0008938 | A1 | 1/2005 | Cho et al. |
| 2011/0262836 | A1 | 10/2011 | Kumar et al. |
| 2014/0101931 | A1 | 4/2014 | Lee et al. |
| 2015/0333307 | A1 | 11/2015 | Thokchom et al. |
| 2015/0349380 | A1 | 12/2015 | Manthiram et al. |
| 2016/0020461 | A1 | 1/2016 | Yang |
| 2016/0020462 | A1 | 1/2016 | Yang |
| 2017/0062829 | A1 | 3/2017 | Ryu et al. |
| 2017/0133662 | A1 | 5/2017 | Cui et al. |
| 2017/0263904 | A1 | 9/2017 | Anandan et al. |
| 2018/0013126 | A1 | 1/2018 | Ivanov et al. |
| 2018/0026302 | A1 | 1/2018 | Kumar et al. |
| 2018/0183055 | A1 | 6/2018 | Chang et al. |
| 2018/0294513 | A1 | 10/2018 | Hwang et al. |
| 2018/0301707 | A1* | 10/2018 | Pan ................. H01M 4/628 |
| 2018/0316051 | A1 | 11/2018 | Lee et al. |
| 2018/0358659 | A1 | 12/2018 | Subbaraman et al. |
| 2019/0051926 | A1 | 2/2019 | Chao et al. |
| 2019/0214671 | A1 | 7/2019 | Chang et al. |
| 2019/0379056 | A1 | 12/2019 | Chen |
| 2021/0104748 | A1* | 4/2021 | Park ................. H01M 4/525 |

FOREIGN PATENT DOCUMENTS

| | | |
|---|---|---|
| CN | 107369848 A | 11/2017 |
| CN | 107863488 A | 3/2018 |
| CN | 108258305 A | 7/2018 |
| CN | 108431994 A | 8/2018 |
| CN | 109155396 A | 1/2019 |
| CN | 110504491 A | 11/2019 |
| JP | 2008-234988 A | 10/2008 |
| JP | 2017-117792 A | 6/2017 |
| KR | 10-2019-0079171 A | 7/2019 |
| TW | 201130188 A1 | 9/2011 |
| TW | I630748 B | 7/2018 |
| TW | I634689 B | 9/2018 |
| TW | I638475 B | 10/2018 |
| WO | WO 2017/019436 A1 | 2/2017 |

OTHER PUBLICATIONS

Adams et al., "Accurate Determination of Coulombic Efficiency for Lithium Metal Anodes and Lithium Metal Batteries," Adv. Energy Mater., vol. 8, 1702097, 2018 (Published online Oct. 11, 2017), pp. 1-11.
Bai et al., "Surface Modification via a Nanosized Nitride Material to Stabilize Lithium Metal Anode," Ceramics International, vol. 45, 2019 (Available online Jan. 5, 2019), pp. 8045-8048.
Cheng et al., "Dendrite-Free Lithium Deposition Induced by Uniformly Distributed Lithium Ions for Efficient Lithium Metal Batteries," Adv. Energy Mater., vol. 28, 2016 (Published online Feb. 22, 2016), pp. 2888-2895.
Li et al., "An Ultrafast Rechargeable Lithium Metal Battery," Journal of Materials Chemistry A, vol. 6, 2018 (Published Jul. 24, 2018), pp. 15517-15522.
Li et al., "Suppressing Dendritic Lithium Formation Using Porous Media in Lithium Metal-Based Batteries," Nano Letters, vol. 18, 2018 (Published Mar. 1, 2018), pp. 2067-2073.
Liang et al., "Polymer Nanofiber-Guided Uniform Lithium Deposition for Battery Electrodes," Nano Letters, vol. 15, 2015 (Published: Mar. 30, 2015), pp. 2910-2916.
Liu et al., "Lithium-coated Polymeric Matrix as a Minimum Volume-Change and Dendrite-Free Lithium Metal Anode," Nature Communications, vol. 7, 10992, Mar. 18, 2016, pp. 1-9.
Liu et al., "Pathways for Practical High-Energy Long-Cycling Lithium Metal Batteries," Nature Energy, vol. 4, No. 3, Mar. 2019 (Publication date Mar. 1, 2019), pp. 180-186 (total 8 pages).
Liu et al., "Stabilizing Lithium Metal Anodes by Uniform Li-Ion Flux Distribution in Nanochannel Confinement," Journal of the American Chemical Society, vol. 138, 2016 (Published: Nov. 2, 2016), pp. 15443-15450.
Taiwanese Office Action and Search Report, dated Jun. 30, 2020, for Taiwanese Application No. 108148529.
Wood et al., "Dendrites and Pits: Untangling the Complex Behavior of Lithium Metal Anodes through Operando Video Microscopy," ACS Cent. Sci., vol. 2, 2016 (Published: Oct. 14, 2016), pp. 790-801.
Yan et al., "An Armored Mixed Conductor Interphase on a Dendrite-Free Lithium-Metal Anode," Advanced Materials, vol. 30, 1804461, 2018 (Published online: Sep. 27, 2018), pp. 1-9.
Zhang et al., "Lithiophilic-lithiophobic Gradient Interfacial Layer for a Highly Stable Lithium Metal Anode," Nature Communications, vol. 9, 3729, 2018, Published online: Sep. 13, 2018, pp. 1-11.
Chinese Office Action and Search Report for Chinese Application No. 201911412705.3, dated Jun. 17, 2022.
Chinese Office Action and Search Report for Chinese Application No. 201911412705.3, dated Jan. 6, 2022.
Japanese Office Action for Japanese Application No. 2020-210084, dated Jan. 5, 2022, with an English translation.

* cited by examiner

ELECTRODE AND LITHIUM-ION BATTERY EMPLOYING THE SAME

CROSS REFERENCE TO RELATED APPLICATIONS

This application claims the benefit of U.S. Provisional Application No. 62/949,934, filed on Dec. 18, 2019, which is hereby incorporated herein by reference.

TECHNICAL FIELD

The disclosure relates to an electrode and a lithium-ion battery employing the same, and in particular to an electrode used in the lithium-ion battery and a lithium-ion battery employing the same.

BACKGROUND

Lithium-ion secondary batteries are mainstream commercial products, and they are presently being developed to be lighter in either weight or volume, to have a higher energy capacity and a longer life cycle, and to be safer. In conventional liquid electrolyte lithium-ion batteries, the energy storage cost per unit is high due to the low gravimetric energy density and the limited life cycle. However, unilaterally increasing the energy density of batteries can easily induce serial safety problems in electrochemical batteries, such as liquid leakage, battery swelling, heating, fuming, burning, explosion, and the like.

Dendrite growth is a phenomenon that occurs during battery charging, whereby active materials, usually metals such as zinc or lithium, are reduced from their oxidized state and deposited onto a substrate. Depending on the charging conditions, the metal may be deposited a dendritic form, and has the potential to penetrate the separator and then short-circuit the cell, resulting in an explosion which is known as thermal runaway.

Therefore, a novel design and structure of the battery is called for to solve the aforementioned problems, prolong the lifespan and enhance the battery's performance.

SUMMARY

The disclosure provides an electrode. The electrode includes an active layer, a conductive layer, and a non-conductive layer. The active material layer can include copper, copper-containing alloy, lithium, lithium-containing alloy, or a combination thereof. The conductive layer is disposed on the top surface of the active layer. The conductive layer includes a first porous film and a conductive lithiophilic material, and the conductive lithiophilic material is within the first porous film and covers the inner surface of the first porous film. The non-conductive layer includes a second porous film and a non-conductive lithiophilic material, and the non-conductive lithiophilic material is within the second porous film and covers the inner surface of the second porous film. According to embodiments of the disclosure, the conductive layer disposed between the active layer and the non-conductive layer, the binding energy ($\Delta G$) of the lithiophilic material with lithium is less than or equal to $-2.6$ eV.

According to embodiments of the disclosure, the disclosure also provides a lithium-ion battery. The lithium-ion battery can include a negative electrode, a solid electrolyte membrane and a positive electrode, wherein the solid electrolyte membrane is disposed between the positive electrode and the negative electrode. The negative electrode is the aforementioned electrode of the disclosure.

A detailed description is given in the following embodiments with reference to the accompanying drawings.

DETAILED DESCRIPTION

Figure 1:
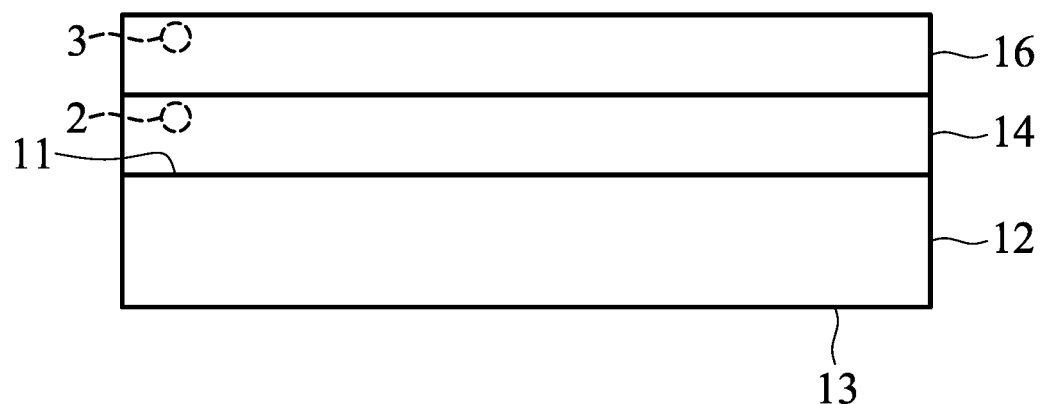
FIG. 1 is a schematic view of the electrode according to an embodiment of the disclosure.

The electrode and the battery of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. As used herein, the term "about" in quantitative terms refers to plus or minus an amount that is general and reasonable to persons skilled in the art.

It should be noted that the elements or devices in the drawings of the disclosure may be present in any form or configuration known to those skilled in the art. In addition, the expression "a layer overlying another layer", "a layer is disposed above another layer", "a layer is disposed on another layer" and "a layer is disposed over another layer" may refer to a layer that directly contacts the other layer, and they may also refer to a layer that does not directly contact the other layer, there being one or more intermediate layers disposed between the layer and the other layer.

The drawings described are only schematic and are non-limiting. In the drawings, the size, shape, or thickness of some of the elements may be exaggerated and not drawn on scale for illustrative purposes. The dimensions and the relative dimensions do not correspond to actual location to practice of the disclosure. The disclosure will be described with respect to particular embodiments and with reference to certain drawings but the disclosure is not limited thereto.

Moreover, the use of ordinal terms such as "first", "second", "third", etc., in the disclosure to modify an element does not by itself connote any priority, precedence, or order of one claim element over another or the temporal order in which it is formed, but are used merely as labels to distinguish one claim element having a certain name from another element having the same name (but for use of the ordinal term) to distinguish the claim elements.

The disclosure provides an electrode, such as a negative electrode used in lithium-ion battery. The electrode can include an active material layer, a conductive layer, and a non-conductive layer. The conductive layer and the non-conductive layer can have a porous structure. By means of the structure constituted by the porous conductive layer and non-conductive layer and the specific lithiophilic material with the conductive layer and the non-conductive layer, the deposition morphology of lithium during charging can be altered, thereby inhibiting dendrite growth and improving the problem of battery swelling during battery charging and discharging. As a result, the lifespan of the lithium-ion battery can be prolonged. According to embodiments of the disclosure, the disclosure also provides a lithium-ion battery. Besides the aforementioned electrode as the negative electrode, the lithium-ion battery can further include a solid electrolyte membrane having specific components. Due to the combination of the specific electrode of the disclosure and the solid electrolyte membrane, the technical bottleneck problems of the lithium battery can be overcome (i.e. inhibiting dendrite growth and improving the problem of electrode swelling). As a result, the goals of increasing the energy density and prolonging the lifespan of the battery can be achieved simultaneously.

According to embodiments of the disclosure, the electrode of the disclosure can include an active material layer, a conductive layer and a non-conductive layer. The active material can include copper, copper-containing alloy, lithium, lithium-containing alloy, or a combination thereof. The conductive layer is disposed on the top surface of the active material layer, wherein the conductive layer includes first porous film and a conductive lithiophilic material. The conductive lithiophilic material is within the first porous film and covers the inner surface of the first porous film. The non-conductive layer includes a second porous film and a non-conductive lithiophilic material. The non-conductive lithiophilic material is within the second porous film and covers an inner surface of the second porous film. According to embodiments of the disclosure, the conductive layer is disposed between the active layer and the non-conductive layer, and the binding energy ($\Delta G$) of the lithiophilic material with lithium is less than or equal to $-2.6$ eV.

FIG. 1 is a schematic view of the electrode 10 according to an embodiment of the disclosure. As shown in FIG. 1, the electrode 10 can include an active material layer 12, a conductive layer 14 and a non-conductive layer 16. As shown in FIG. 1, the conductive layer 14 is disposed on the top surface 11 of the active material layer 12, and the non-conductive layer 16 is disposed on the conductive layer 14. Namely, the conductive layer 14 is disposed between the active material layer 12 and the non-conductive layer 16. According to embodiments of the disclosure, the active material layer 12 can include copper, copper-containing alloy, lithium, lithium-containing alloy, or a combination thereof. According to embodiments of the disclosure, the lithium-containing alloy can be aluminum-lithium-containing alloy, lithium-magnesium-containing alloy, lithium-zinc-containing alloy, lithium-lead-containing alloy, or lithium-tin-containing alloy. In addition, according to an embodiment of the disclosure, the active material layer 12 can consist of lithium. According to an embodiment of the disclosure, the electrode 10 can consist of the active material layer 12, the conductive layer 14 and the non-conductive layer 16.

According to embodiments of the disclosure, the thickness of the active material layer 12 is not limited and can be optionally modified by a person of ordinary skill in the field. For example, the thickness of the active material layer 12 can be from about 1 μm to 1,000 μm (such as about 10 μm, 50 μm, 100 μm, 200 μm, 300 μm, 400 μm, 500 μm, 600 μm, 700 μm, 800 μm, or 900 μm). According to embodiments of the disclosure, the thickness of the conductive layer can be from about 1 μm to 500 μm (such as about 5 μm, 10 μm, 20 μm, 25 μm, 50 μm, 100 μm, 200 μm, 250 μm, 300 μm, 400 μm, or 450 μm), and the thickness of the non-conductive layer can be from about 1 μm to 500 μm (such as about 5 μm, 10 μm, 20 μm, 25 μm, 50 μm, 100 μm, 200 μm, 250 μm, 300 μm, 400 μm, or 450 μm). If the thickness of the conductive layer (and/or the non-conductive layer) is too thin, the lithium deposition would be non-uniform, resulting in the lithium dendrite growth. Further, the electrode could not provide sufficient space for the lithium deposition, resulting in the problem of electrode swelling. According to embodiments of the disclosure, the thickness ratio of the conductive layer to the non-conductive layer can be from about 1:10 to 10:1, such as about 1:9, 1:8, 1:7, 1:6, 1:5, 1:4, 1:3, 1:2, 1:1, 2:1, 3:1, 4:1, 5:1, 6:1, 7:1, 8:1, or 9:1. If the thickness ratio of the conductive layer to the non-conductive layer is too high or too low, the lithium deposition would be non-uniform, resulting in the lithium dendrite growth.

Figure 2:
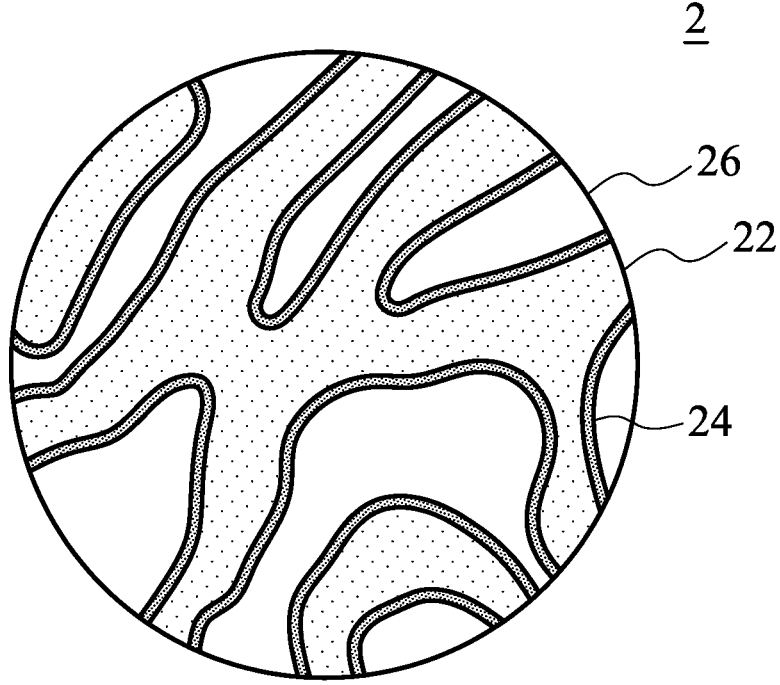
FIG. 2 is a close-up schematic view of the region 2 in the conductive layer 14 of the electrode as shown in FIG. 1.

FIG. 2 is a close-up schematic view of the region 2 in the conductive layer 14 of the electrode 10 as shown in FIG. 1. As shown in FIG. 2, the conductive layer 14 can include a first porous film 22 and a conductive lithiophilic material 24, wherein the first porous film 22 has a plurality of pores 26 therein, and the conductive lithiophilic material 24 can be disposed in the pores 26 to cover the inner surface of the first porous film 22. In detail, the conductive lithiophilic material 24 covers the surface of the porous structure of the first porous film 22. According to embodiments of the disclosure, the first porous film 22 can be a layer with a net structure. According to embodiments of the disclosure, the first porous film 22 can have a first porosity, wherein the first porosity can be from about 70 vol % to 99 vol % (such as about 71 vol %, 72 vol %, 73 vol %, 74 vol %, 75 vol %, 76 vol %, 77 vol %, 78 vol %, 79 vol %, 80 vol %, 81 vol %, 82 vol %, 83 vol %, 84 vol %, 85 vol %, 86 vol %, 87 vol %, 88 vol %, 89 vol %, 90 vol %, 91 vol %, 92 vol %, 93 vol %, 94 vol %, 95 vol %, 96 vol %, 97 vol %, or 98 vol %). The porosity can be measured by the following equation: $P=(V1/(V1+V2))\times 100\%$, wherein P is the porosity, V1 is the volume of the pores 26 and V2 is the volume of the first porous film 22. A porosimeter can be used to determine the porosity. If the porosity is too low, the electrode could not provide sufficient space for the lithium deposition, resulting in the problem of electrode swelling (i.e. the lithium may be deposed outside the electrode). According to embodiments of the disclosure, the first porous film 22 can have a first average pore size, wherein the first average pore size can be from about 5 μm to 100 μm (such as about 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, or 95 μm). The average pore size can be determined by the method according to ISO 15901-2. If the first average pore size is too low, the lithium deposition efficiency would be limited. If the first average pore size is too high, an effective conductive network would not be formed. According to an embodiment of the disclosure, the conductive layer 14 can consist of the first porous film 22 and the conductive lithiophilic material 24.

According to embodiments of the disclosure, suitable material of the first porous film can be polyimide (PI), polyethylene (PE), polypropylene (PP), polyurethane (PU), polyvinyl alcohol (PVA), polydimethylsiloxane (PDMS), carbon fiber, or a combination thereof.

According to embodiments of the disclosure, since the conductive layer can have conductive lithiophilic material, the lithium is apt to be deposited in the conductive layer with the porous structure. The term "conductive lithiophilic material" of the disclosure means a conductive material which is apt to bind with the lithium. The lithiophilicity of the conductive material can be determined by the binding energy (ΔG) between the conductive material and lithium. According to embodiments of the disclosure, the binding energy (ΔG) between the conductive lithiophilic material and lithium can be less than or equal to about −2.6 eV, wherein the binding energy means the free energy for binding two substances. The two substances are apt to bind together when lowering the binding energy. The binding energy between the conductive lithiophilic material and lithium (ΔG) measured by the following equation: $\Delta G = E_{C\text{-}Li} - E_C - E_{Li}$, wherein $E_{C\text{-}Li}$ is the free energy for binding the conductive lithiophilic material with lithium; $E_C$ is the free energy of the conductive lithiophilic material; and, $E_{Li}$ is the free energy of lithium (at 0 K and under vacuum state).

Table 1 lists the binding energy (ΔG) (between the material and lithium) and resistivity of some materials:

TABLE 1

|  | ΔG(eV) | resistivity (Ω · m)(20° C.) |
|---|---|---|
| Co | −0.30 | $6.23 \times 10^{-8}$ Ω · m |
| Fe | −1.11 | $1.05 \times 10^{-7}$ Ω · m |
| Mg | −1.66 | $4.41 \times 10^{-8}$ Ω · m |
| Zn | −1.83 | $5.93 \times 10^{-8}$ Ω · m |
| Al | −1.87 | $2.82 \times 10^{-8}$ Ω · m |
| Ag | −2.10 | $1.61 \times 10^{-8}$ Ω · m |
| Sn | −2.26 | $1.14 \times 10^{-7}$ Ω · m |
| Cu | −2.31 | $1.70 \times 10^{-8}$ Ω · m |
| Ti | −2.55 | $4.20 \times 10^{-8}$ Ω · m |
| Ni | −2.70 | $6.94 \times 10^{-8}$ Ω · m |
| Au | −2.72 | $2.44 \times 10^{-8}$ Ω · m |
| W | −2.73 | $5.48 \times 10^{-8}$ Ω · m |
| reduced graphene | −2.73 | $5.0 \times 10^{-7}$ Ω · m |
| Pt | −3.41 | $1.1 \times 10^{-7}$ Ω · m |

As shown in Table 1, the conductive lithiophilic material can be nickel, gold, platinum, tungsten, reduced graphene, or a combination thereof. The resistivity of the conductive lithiophilic material can be less than or equal to about $9.9\times10^{-7}$ Ω·m, such as less than or equal to about $5.0\times10^{-7}$ Ω·m, less than or equal to about $1.0\times10^{-7}$ Ω·m, or less than or equal to about $5.0\times10^{-8}$ Ω·m. According to embodiments of the disclosure, since the conductive layer 14 can be directly disposed on the active material layer 12 to homogenize the electron flow due to the conductivity of the conductive layer, lithium can be deposited from the conductive layer of the electrode (i.e. lithium can be initially deposited from the top surface 11 of the active material layer 12 and formed within the conductive layer 14) during battery charging and discharging.

Figure 3:
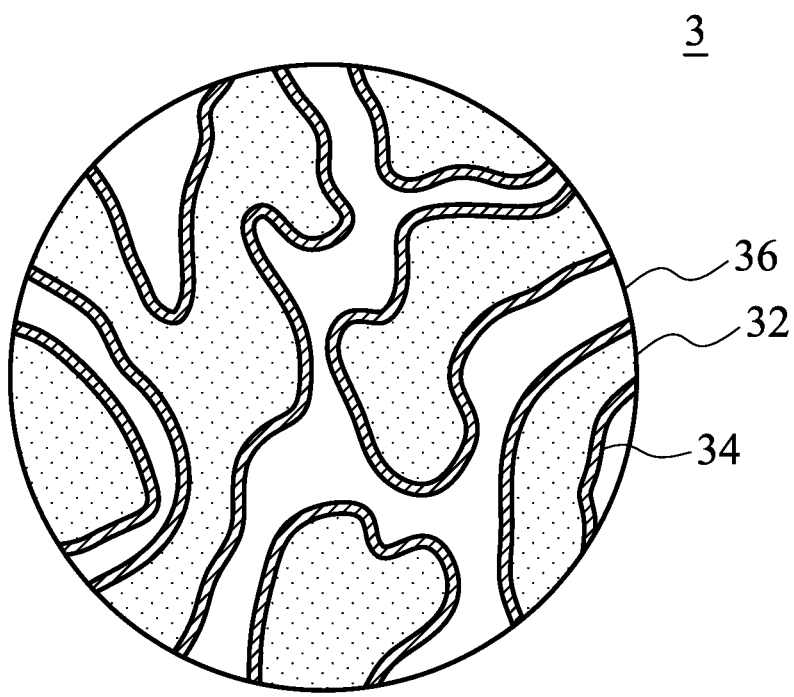
FIG. 3 is a close-up schematic view of the region 3 in the non-conductive layer 16 of the electrode as shown in FIG. 1.

FIG. 3 is a close-up schematic view of the region 3 in the non-conductive layer 16 of the electrode 10 as shown in FIG. 1. As shown in FIG. 3, the non-conductive layer 16 can include a second porous film 32 and a non-conductive lithiophilic material 34, wherein the second porous film 32 has a plurality of pores 36 therein, and the non-conductive lithiophilic material 34 can be disposed in the pores 36 to cover the inner surface of the second porous film 32. In detail, the non-conductive lithiophilic material 34 covers the surface of the porous structure of the second porous film 32. According to embodiments of the disclosure, the second porous film 32 can be a layer with a net structure. According to embodiments of the disclosure, the second porous film 32 can have a second porosity, wherein the second porosity can be from about 70 vol % to 99 vol % (such as about 71 vol %, 72 vol %, 73 vol %, 74 vol %, 75 vol %, 76 vol %, 77 vol %, 78 vol %, 79 vol %, 80 vol %, 81 vol %, 82 vol %, 83 vol %, 84 vol %, 85 vol %, 86 vol %, 87 vol %, 88 vol %, 89 vol %, 90 vol %, 91 vol %, 92 vol %, 93 vol %, 94 vol %, 95 vol %, 96 vol %, 97 vol % or 98 vol %). The porosity can be measured by the following equation: $P=(V3/(V3+V4))\times 100\%$, wherein P is the porosity, V3 is the volume of the pores 36 and V4 is the volume of the second porous film 32. A porosimeter can be used to determine the porosity. If the porosity is too low, the electrode could not provide sufficient space for the lithium deposition, resulting in the problem of electrode swelling (i.e. the lithium may be deposed outside the electrode). According to embodiments of the disclosure, the first porosity of the first porous film 22 can be substantially the same with the second porosity of the second porous film 32. According to embodiments of the disclosure, the first porosity of the first porous film 22 can be substantially greater than the second porosity of the second porous film 32, resulting in that lithium can be deposited from the conductive layer of the electrode (i.e. lithium can be initially deposited from the top surface 11 of the active material layer 12 and formed within the conductive layer 14) during battery charging and discharging. According to embodiments of the disclosure, the non-conductive layer 16 can consist of the second porous film 32 and the non-conductive lithiophilic material 34.

According to embodiments of the disclosure, the second porous film 32 can have a second average pore size, wherein the second average pore size can be from about 5 μm to 100 μm (such as about 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, or 95 μm). If the second average pore size is too low, the lithium deposition efficiency would be limited. If the second average pore size is too high, an effective conductive network would not be formed. According to embodiments of the disclosure, the first average pore size of the first porous film 22 can be substantially the same with the second average pore size of the second porous film 32. According to embodiments of the disclosure, the first average pore size of the first porous film 22 can be substantially greater than the second average pore size of the second porous film 32. As a result, lithium can be deposited from the conductive layer of the electrode (i.e. lithium can be initially deposited from the top surface 11 of the active material layer 12 and formed within the conductive layer 14).

According to embodiments of the disclosure, suitable material of the second porous film can be polyimide (PI), polyethylene (PE), polypropylene (PP), polyurethane (PU), polyvinyl alcohol (PVA), polydimethylsiloxane (PDMS), carbon fiber, or a combination thereof. According to embodiments of the disclosure, the material of the first porous film can be the same with the material of the second porous film. According to embodiments of the disclosure, the material of the first porous film can be distinct from the material of the second porous film.

According to embodiments of the disclosure, since the non-conductive layer has a non-conductive lithiophilic material and the non-conductive layer is disposed above the conductive layer (i.e. the conductive layer is closer to the active material layer 12 than the non-conductive layer to the active material layer 12), lithium is apt to be initially deposited from the conductive layer and the deposition morphology of lithium can be altered, resulted from that the electron flow is not gathered on the surface of the non-conductive layer due to the characteristics of non-conductive material. The term "non-conductive lithiophilic material" of the disclosure means a non-conductive material which is apt to bind with the lithium. The lithiophilicity of the conductive material can be determined by the binding energy ($\Delta G$) between the non-conductive material and lithium. According to embodiments of the disclosure, the binding energy ($\Delta G$) between the non-conductive lithiophilic material and lithium can be less than or equal to about $-2.6$ eV, wherein the binding energy means the free energy for binding two substances. The two substances are apt to bind together when lowering the binding energy. The binding energy between the conductive lithiophilic material and lithium ($\Delta G$) measured by the following equation: $\Delta G = E_{N-Li} - E_N - E_{Li}$, wherein $E_{N-Li}$ is the free energy for binding the non-conductive lithiophilic material with lithium; $E_N$ is the free energy of the non-conductive lithiophilic material; and, $E_{Li}$ is the free energy of lithium (at 0 K and under vacuum state). Table 2 lists the binding energy ($\Delta G$) (between the material and lithium) and resistivity of some materials:

TABLE 2

| | $\Delta G$(eV) | resistivity ($\Omega \cdot$ m) (20° C.) |
|---|---|---|
| graphite | −0.81 | $5.96 \times 10^{-6}$ $\Omega \cdot$ m |
| TiO$_2$ | −2.27 | $>1.0 \times 10^{-6}$ $\Omega \cdot$ m |
| Al$_2$O$_3$ | −2.55 | $2.0 \times 10^{11}$ $\Omega \cdot$ m |
| Si | −2.72 | $>1.0 \times 10^{-1}$ $\Omega \cdot$ m |
| SiO$_2$ | −2.96 | $>1.0 \times 10^{-6}$ $\Omega \cdot$ m |
| ZrO$_2$ | −2.63 | $1.1 \times 10^{9}$ $\Omega \cdot$ m |
| ZnO | −3.01 | $>1.0 \times 10^{-4}$ $\Omega \cdot$ m |
| Li$_3$N | −3.19 | $5.0 \times 10^{7}$ $\Omega \cdot$ m |
| SnO$_2$ | −3.34 | $>2.5 \times 10^{4}$ $\Omega \cdot$ m |
| BN | −4.07 | $1.7 \times 10^{11}$ $\Omega \cdot$ m |
| V$_2$O$_5$ | −4.49 | $>1.4 \times 10^{-5}$ $\Omega \cdot$ m |

As shown in Table 2, the non-conductive lithiophilic material can be Si, SiO$_2$, ZrO$_2$, ZnO, Li$_3$N, SnO$_2$, BN, V$_2$O$_5$, or a combination thereof. According to embodiments of the disclosure, the resistivity of the non-conductive lithiophilic material can be greater than or equal to about $1.0 \times 10^{-6}$ $\Omega \cdot$m, such as greater than or equal to about $1.0 \times 10^{-5}$ $\Omega \cdot$m, greater than or equal to about $1.0 \times 10^{-1}$ $\Omega \cdot$m, or greater than or equal to about $1.0 \times 10^{4}$ $\Omega \cdot$m.

Figure 4:
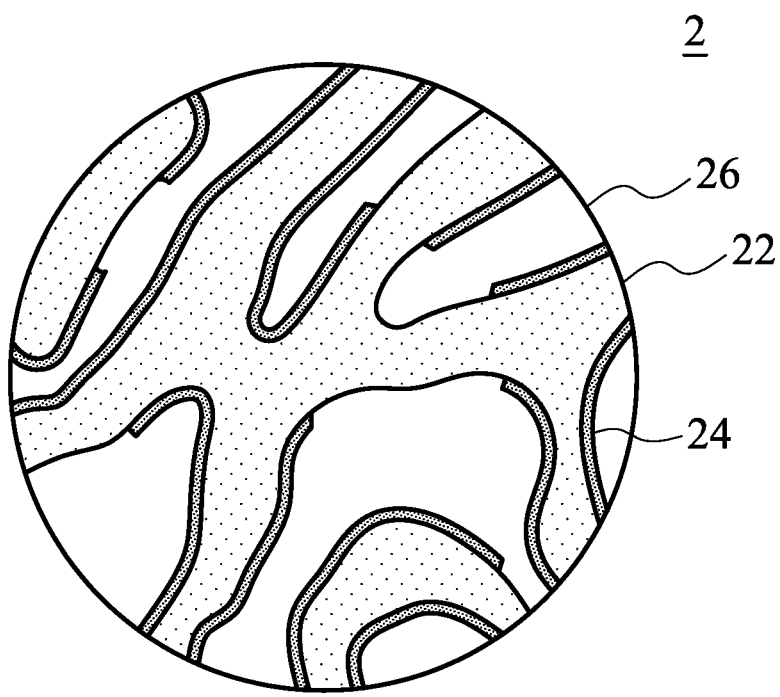
FIG. 4 is a close-up schematic view of the region 2 in the conductive layer 14 of the electrode according to some embodiments of the disclosure.
Figure 5:
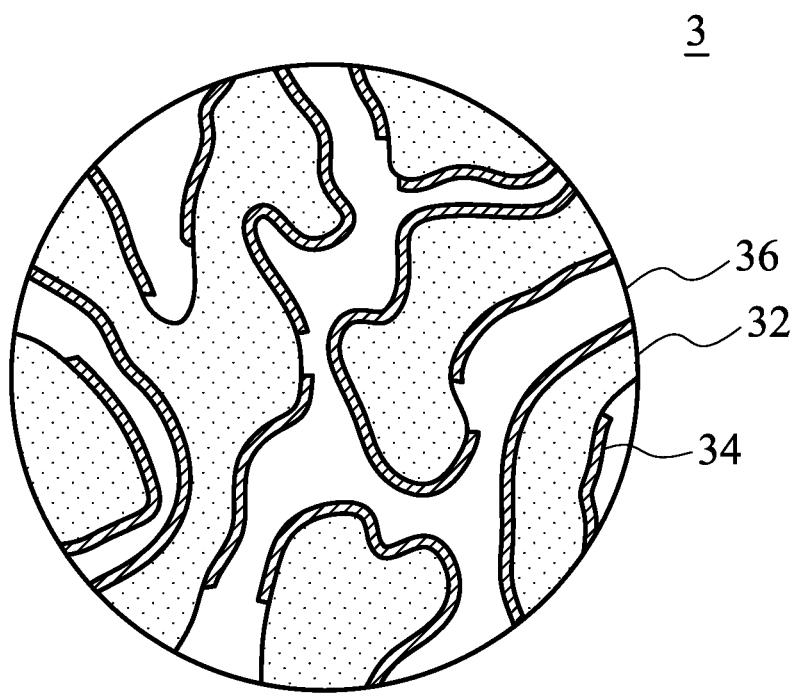
FIG. 5 is a close-up schematic view of the region 3 in the non-conductive layer 16 of the electrode according to some embodiments of the disclosure.

According to embodiments of the disclosure, the conductive lithiophilic material 24 can cover whole surface of the first porous film 22 (as shown in FIG. 2). Otherwise, the conductive lithiophilic material 24 can cover partial surface of the first porous film 22 (as shown in FIG. 4). According to embodiments of the disclosure, the non-conductive lithiophilic material 34 can cover whole surface of the second porous film 32 (as shown in FIG. 3). Otherwise, the non-conductive lithiophilic material 34 can cover partial surface of the second porous film 32 (as shown in FIG. 5).

Figure 6:
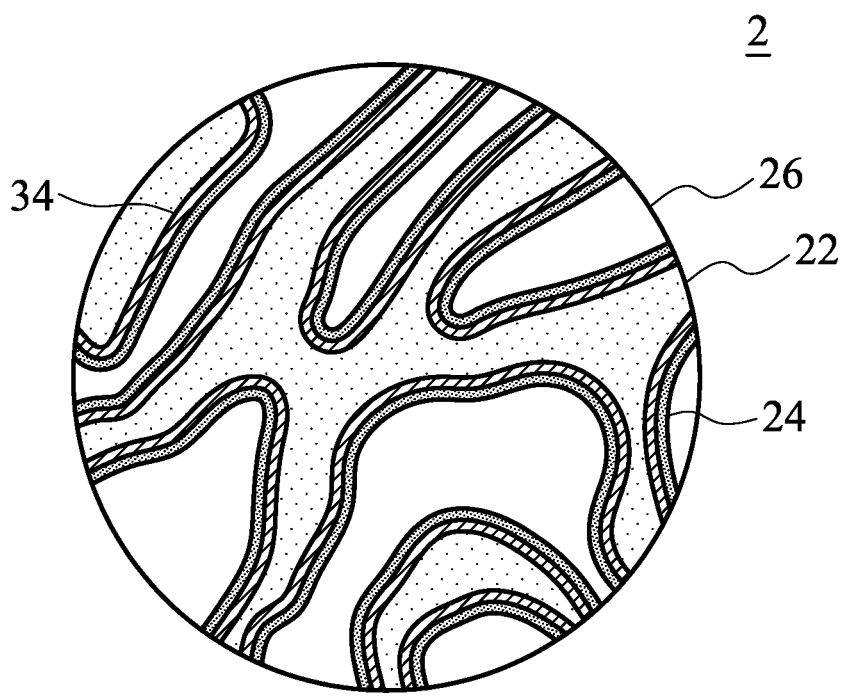
FIG. 6 is a close-up schematic view of the region 2 in the conductive layer 14 of the electrode according to some embodiments of the disclosure.

According to an embodiment of the disclosure, the conductive layer 14 can include a first porous film 22, a non-conductive lithiophilic material 34, and a conductive lithiophilic material 24. There is a plurality of pores 26 within the first porous film 22, and the non-conductive lithiophilic material 34 can be disposed in the pores 26 to cover the surface of the first porous film 22. In addition, the conductive lithiophilic material 24 can also be disposed in the pores 26 and disposed on the non-conductive lithiophilic material 34. The non-conductive lithiophilic material 34 is covered by the conductive lithiophilic material 24. Therefore, the non-conductive lithiophilic material 34 is disposed between the first porous film 22 and the conductive lithiophilic material 24, as shown in FIG. 6. According to an embodiment of the disclosure, the conductive layer 14 can consist of the first porous film 22, the non-conductive lithiophilic material 34 and the conductive lithiophilic material 24.

Figure 7:
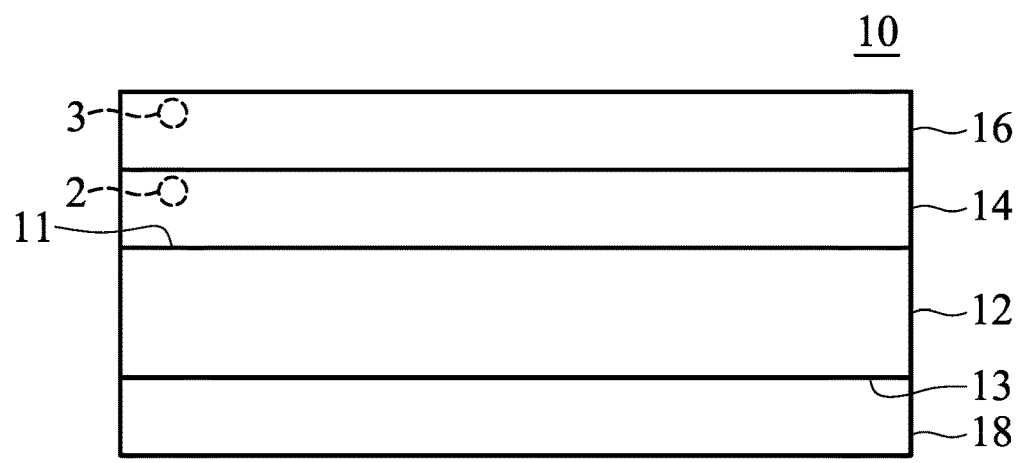
FIG. 7 is a schematic view of the electrode according to some embodiments of the disclosure.

According to embodiments of the disclosure, the electrode of the disclosure 10 can include a current-collecting layer 18, as shown in FIG. 7. The current-collecting layer 18 can be disposed on the bottom surface 13 of the active material layer 12. Namely, the active material layer is disposed between the current-collecting layer and the conductive layer. The current-collecting layer can include metal foil, such as aluminum foil or copper foil. The thickness of the current-collecting layer is not limited and can be optionally modified by a person of ordinary skill in the field. For example, the thickness of the current-collecting layer can be from 5 μm to 500 μm.

According to embodiments of the disclosure, the method for preparing the electrode of the disclosure can include the following steps. First, an active material layer is provided. According to some embodiments of the disclosure, the provided active material layer can also be disposed on a current-collecting layer. Next, a porous layer is formed on the active material layer, wherein the porous layer consists of a first porous film and a second porous film, and the portion of the porous layer, which directly contacts to the active material layer, is defined as the first porous film; and, the portion, which does not directly contact to the active material layer, is defined as a second porous film. Next, a conductive lithiophilic material is formed on the surface of the porous structure of the first porous film. Next, a non-conductive lithiophilic material is disposed on the surface of the porous structure of the second porous film.

According to some embodiments of the disclosure, the method for preparing the electrode of the disclosure can include the following steps. First, an active material layer is provided. According to some embodiments of the disclosure, the provided active material layer can also be disposed on a current-collecting layer. Next, a porous layer is formed on the active material layer, wherein the porous layer consists of a first porous film and a second porous film, and the portion of the porous layer, which directly contacts to the active material layer, is defined as the first porous film, and the portion, which does not directly contact to the active material layer, is defined as a second porous film. Next, a non-conductive lithiophilic material is formed on the surface of the porous structure of the first porous film and the surface of the porous structure of the second porous film. Next, a conductive lithiophilic material is formed on the surface of the porous structure of the first porous film to cover the non-conductive lithiophilic material formed on the surface of the porous structure of the first porous film. Since the non-conductive lithiophilic material is covered by the conductive lithiophilic material, the conductive lithiophilic material is exposed from the pores of the porous structure of the first porous film, rather than exposing the conductive lithiophilic material.

According to some embodiments of the disclosure, the method for preparing the electrode of the disclosure can include the following steps. First, an active material layer is provided. According to some embodiments of the disclosure, the provided active material layer can also be disposed on a current-collecting layer. Next, a first porous film is formed on the active material layer. Next, a conductive lithiophilic material is formed within the first porous film to cover the surface of the porous structure of the first porous film. Next, a second porous film is formed on the first porous film. Next, a non-conductive lithiophilic material is formed within the second porous film to cover the surface of the porous structure of the second porous film.

According to embodiments of the disclosure, the process for forming the conductive lithiophilic material can be screen printing, physical vapor deposition (PVD), chemical vapor deposition (CVD), electroplating, electroless plating, sputtering, resistive heating evaporation, electron beam evaporation, pulsed laser deposition, atomic layer deposition (ALD), or a combination thereof. According to embodiments of the disclosure, the process for forming the non-conductive lithiophilic material can be screen printing, spin coating, bar coating, blade coating, roller coating, solvent casting, dip coating, or a combination thereof.

Figure 8:
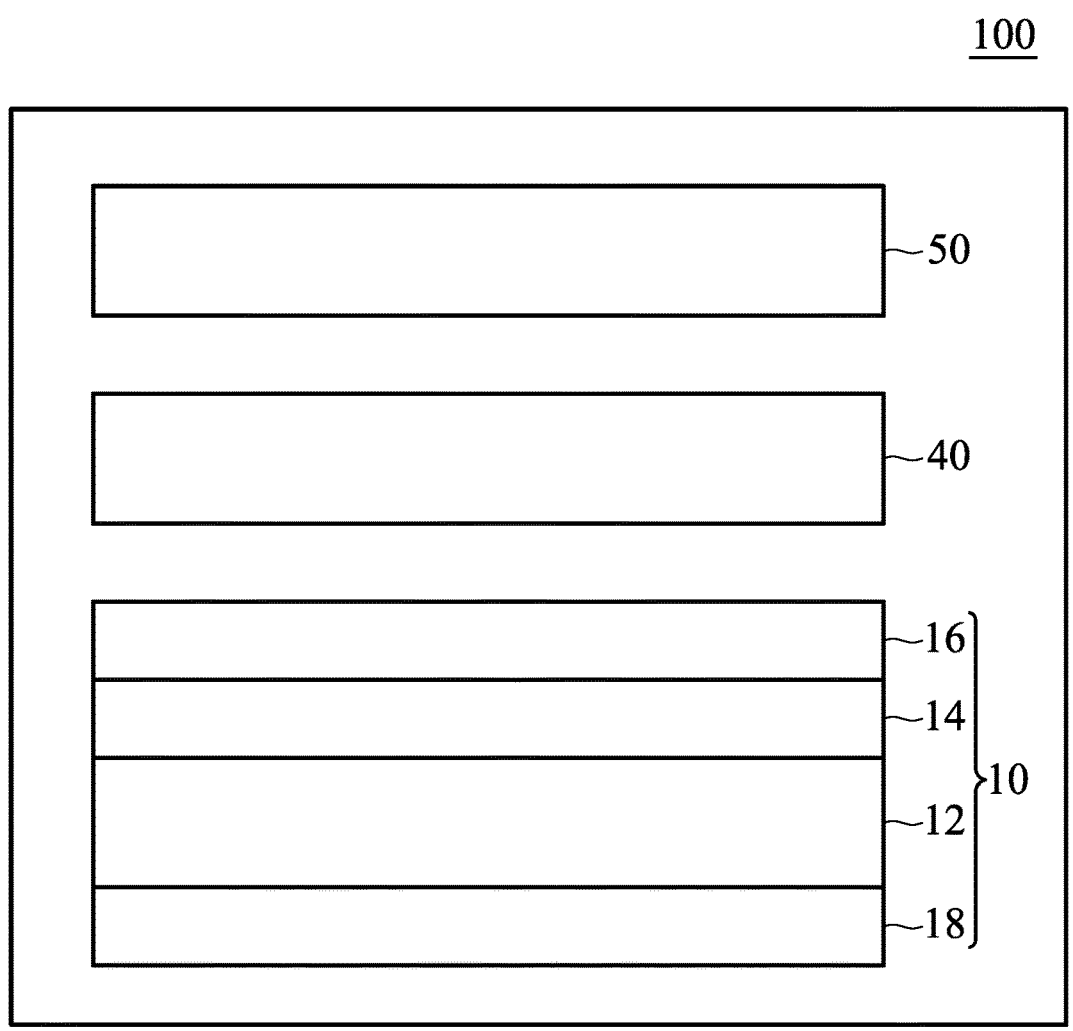
FIG. 8 is a schematic view of the lithium-ion battery according to an embodiment of the disclosure

According to embodiments of the disclosure, the disclosure also provides a lithium-ion battery, which can include the aforementioned electrode. As shown in FIG. 8, the lithium-ion battery 100 can include a negative electrode 10, a positive electrode 50, and a solid electrolyte membrane 40, wherein the negative electrode 10 is separated from the positive electrode 50 by the solid electrolyte membrane 40. The negative electrode 10 can be the aforementioned electrode of the disclosure. According to embodiments of the disclosure, the electrode 10 can include an active material layer 12, a conductive layer 14, and a non-conductive layer 16. According to embodiments of the disclosure, the electrode 10 can include an active material layer 12, conductive layer 14, non-conductive layer 16, and a current-collecting layer 18. According to embodiments of the disclosure, the positive electrode 50 can be a positive electrode active layer, wherein the positive electrode active layer can include a positive electrode active material. According to embodiments of the disclosure, the positive electrode active material includes elementary sulfur, organic sulfide, sulfur carbon composite, metal-containing lithium oxide, metal-containing lithium sulfide, metal-containing lithium selenide, metal-containing lithium telluride, metal-containing lithium phosphide, metal-containing lithium silicide, metal-containing lithium boride, or a combination thereof. In particular, the metal is selected from a group of aluminum, vanadium, titanium, chromium, copper, molybdenum, niobium, iron, nickel, cobalt, and manganese. According to embodiments of the disclosure, the positive electrode active material can be lithium-cobalt oxide ($LiCoO_2$), lithium-nickel oxide ($LiNiO_2$), lithium-manganese oxide ($LiMn_2O_4$), lithium-manganese-cobalt oxide ($LiMnCoO_2$), lithium-cobalt-manganese-cobalt oxide ($LiMnCoO_4$), lithium-cobalt-nickel-manganese oxide ($LiCo_{0.3}Mn_{0.3}O$), lithium-cobalt phosphate ($LiCoPO_4$), lithium-manganese-chromium oxide ($LiMnCrO_4$), lithium-nickel-vanadium oxide ($LiNiVO_4$), lithium-manganese-nickel oxide ($LiMn_{1.5}Ni0.5O_4$), lithium-cobalt-vanadium oxide ($LiCoVO_4$), or a combination thereof. According to embodiments of the disclosure, the positive electrode active layer can further include a positive electrode current-collecting layer (not shown), and the positive electrode active material is disposed on the positive electrode current-collecting layer or disposed within the positive electrode current-collecting layer. According to an embodiment of the disclosure, the positive electrode can consist of the positive electrode active layer and the positive electrode current-collecting layer.

According to embodiments of the disclosure, the solid electrolyte membrane 40 can include a composition. According to embodiments of the disclosure, the solid electrolyte membrane 40 can be prepared by a first composition. The first composition can include (a) 100 parts by weight of oxide-based solid-state inorganic electrolyte; (b) 20 to 70 parts by weight (such as 30 parts by weight, 40 parts by weight, 50 parts by weight, or 60 parts by weight) of $Li[R^2(—OR^1)_n—OR^2]Y$, wherein $R^1$ is $C_{1-4}$ alkylene group, $R^2$ is $C_{1-4}$ alkyl group, n is from 2 to 100, and Y is $PF_6^-$, $BF_4^-$, $AsF_6^-$, $SbF_6^-$, $ClO_4^-$, $AlCl_4^-$, $GaCl_4^-$, $NO_3^-$, $C(SOCF_3)_3^-$, $N(SO_2CF_3)_2^-$, $SCN^-$, $O_3SCF_2CF_3^-$, $C_6F_5SO_3^-$, $O_2CCF_3^-$, $SO_3F^-$, $B(C_6H_5)_4 CF_3SO_3^-$, or a combination thereof; (c) 1 to 10 parts by weight of nanoscale oxide; and, (d) 1 to 20 parts by weight of binder. According to embodiments of the disclosure, the components (a)-(d) of the first composition are mixed uniformly to form a composite.

According to embodiments of the disclosure, the oxide-based solid-state inorganic electrolyte can be lithium-containing oxide-based solid-state inorganic electrolyte, such as lithium lanthanum zirconium oxide, lithium lanthanum titanium oxide, lithium aluminum titanium phosphate, and the like, or a combination thereof.

According to embodiments of the disclosure, if the amount of $Li[R^2(—OR^1)_n—OR^2]Y$ is too low, the solid electrolyte membrane exhibits a low ionic conductivity. If the amount of $Li[R^2(—OR^1)_n—OR^2]Y$ is too high, the solid electrolyte membrane exhibits a poor mechanical strength. If n value is too low, the solid electrolyte membrane exhibits a poor mechanical strength. If n value is too high, the solid electrolyte membrane exhibits a low ionic conductivity at room temperature. In one embodiment, $R_1$ is ethylene group, $R_2$ is methyl group, n is 4, and Y is $N(SO_2CF_3)_2^-$ for $Li[R^2(—OR^1)_n—OR^2]Y$. Too little amount of the nano-oxide causes a low film formability of the solid electrolyte membrane. Too much of the nano-oxide causes the poor ionic conductivity of the solid electrolyte membrane. In one embodiment, the nano-oxide includes silicon oxide, aluminum oxide, cerium oxide, titanium oxide, or a combination thereof. In one embodiment, the nano-oxide has a size of 5 nm to 100 nm. Nano-oxide that is too small may not be easily dispersed in the electrolyte. Nano-oxide that is too large may result in the electrolyte having poor ionic conductivity. Too little amount of the binder cannot form the solid electrolyte membrane. Too much amount of the binder may form a hard and brittle solid electrolyte membrane. In one embodiment, the binder includes polyvinylidene fluoride (PVDF), polytetrafluoroethylene (PTFE), polyvinyl alcohol (PVA), polyethylene glycol (PEG), carboxymethyl cellulose (CMC), styrene butadiene rubber (SBR), polyacrylate, polyacrylonitrile (PAN), or a combination thereof.

In another embodiment, the first composition can further include (e) 1 to 20 parts by weight of hyper-branched polymer, and the surface of the oxide-based solid-state inorganic electrolyte is modified by the hyper-branched polymer. The hyper-branched polymer may improve the organic-inorganic compatibility and enhancing the ionic conductivity of the solid electrolyte membrane. Too much amount of hyper-branched polymer may result in poor ionic conductivity of the solid electrolyte membrane. In one embodiment, the hyper-branched polymer and the surface of the oxide-based solid-state inorganic electrolyte have bonds therebetween. The hyper-branched polymer is formed by a cross-linking reaction of a prepolymer and a basic promoter, and the prepolymer is formed by a reaction of a precursor containing a maleimide functional group and a precursor of a Lewis base. For example, the precursor containing a maleimide functional group may have a structure of

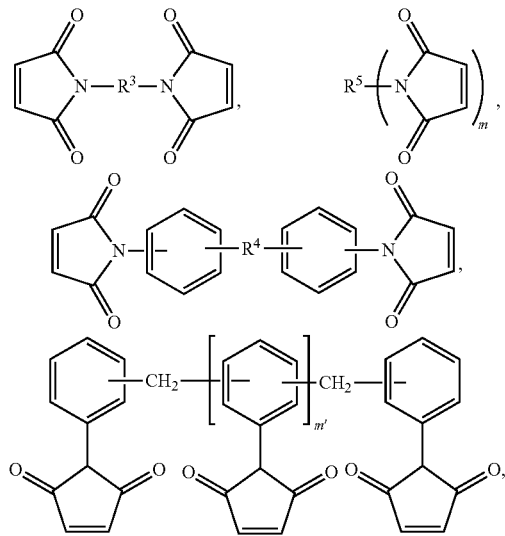

or a combination thereof, wherein $R^3$ is —$CH_2NCH_2$—, —$C_2H_4NHC_2H_4$—, —$C(O)$ $CH_2$—, —$CH_2OCH_2$—, —$C(O)$—, —$O$—, —$S$—, —$S$—$S$—, —$S(O)$—, —$CH_2S$ (O) $CH_2$—, —(O) $S(O)$—, —$CH_2(C_6H_4)$ $CH_2$—, —$CH_2$ $(C_6H_4)$ $O$—, —($CH_2CH(CH_3)$) $O$)—, phenylene group, biphenylene group, $C_{2-8}$ alkylene group,

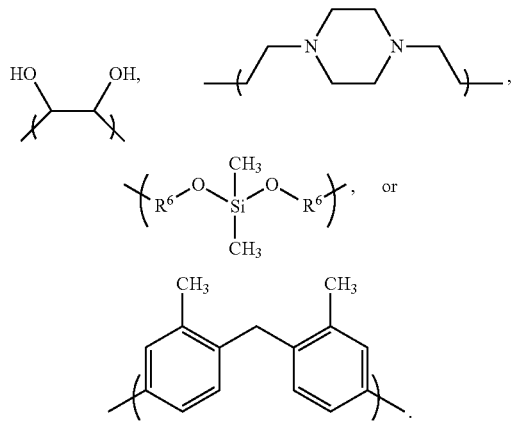

Each $R^6$ is independently —($CH_2CH_2$) $O$—, phenylene group, or $C_{2-8}$ alkylene group. $R^4$ is $C_{2-8}$ alkylene group, —$C(O)$—, —$C(CH_3)_2$—, —$O$—, —$S$—, —$S$—$S$—, —$S(O)$—, —(O) $S(O)$—, or —$O(C_6H_4)$ $C(CF_3)_2(C_6H_4)$ $O$—.

When m=3, $R^5$ is

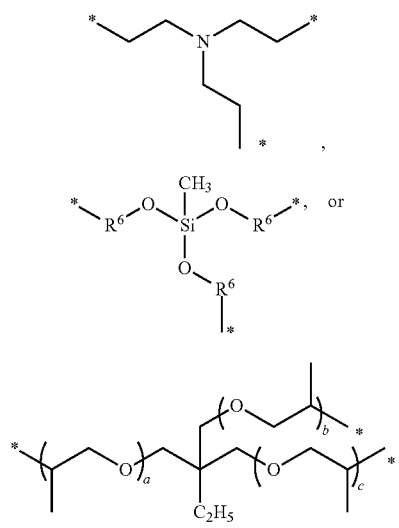

wherein each $R^6$ is independently —($CH_2CH_2$) $O$—, phenylene group, or $C_{2-8}$ alkylene group. a+b+c=5 or 6, and each of a, b, and c is greater than or equal to 1. When m=4, $R^5$ is

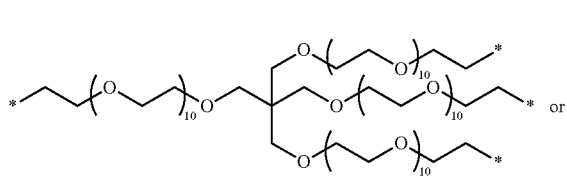

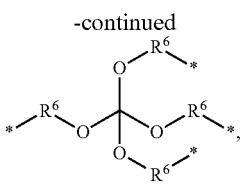

wherein each $R^6$ is independently —$(CH_2CH_2)$ O—, phenylene group, or $C_{2-8}$ alkylene group. When m=8, $R^5$ is

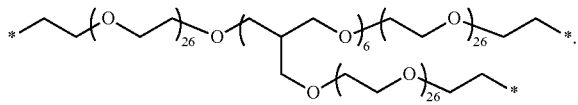

Furthermore, m' is from 2 to 5.

The precursor of Lewis base may have a structure of

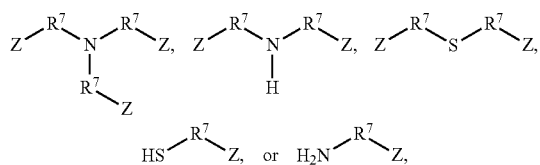

wherein Z is —SH or —$NH_2$, and $R^7$ is

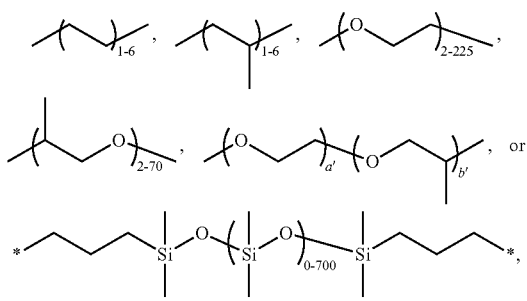

wherein a'+b'=45.

The basic promoter may have a structure of

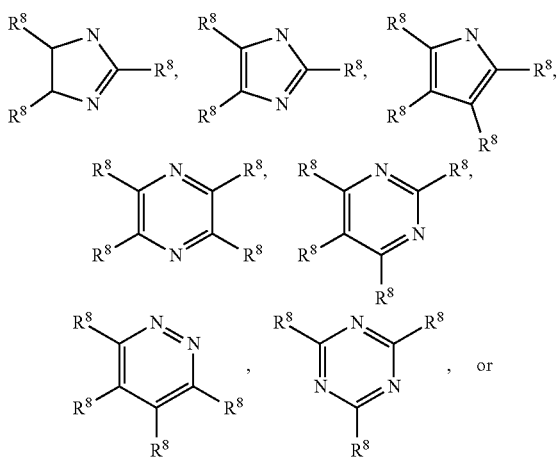

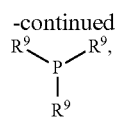

wherein each $R^8$ is independently H, alkyl group, alkenyl group, phenyl group, dimethylamino group, halogen, or —$NH_2$, and wherein each $R^9$ is independently alkyl group, alkenyl group, phenyl group, or halogen.

According to embodiments of the disclosure, alkylene group can be linear or branched alkylene group. For example, $C_{1-8}$ alkylene group can be methylene group, ethylene group, propylene group, butylene group, pentylene group, hexylene group, heptylene group, octylene group, or an isomer thereof. According to embodiments of the disclosure, alkyl group can be linear or branched alkyl group. For example, $C_{1-8}$ alkyl group can be methyl, ethyl, propyl, butyl, pentyl, hexyl, heptyl, octyl, or an isomer thereof.

According to embodiments of the disclosure, the thickness of the solid electrolyte membrane can be from about 1 μm to 500 μm, such as 5 μm, 10 μm, 20 μm, 50 μm, 100 μm, 150 μm, 200 μm, 250 μm, 300 μm, 350 μm, 400 μm, or 450 μm. If the thickness of the solid electrolyte membrane is too high, the energy density of the battery would be deteriorated. If the thickness of the solid electrolyte membrane is too low, the cycling stability of the battery would be deteriorated.

According to some embodiments of the disclosure, the top surface of the solid electrolyte membrane can be covered by a porous layer. According to embodiments of the disclosure, the bottom surface of the solid electrolyte membrane can be covered by another porous layer. According to embodiments of the disclosure, the top surface and the bottom surface of the solid electrolyte membrane can be covered by a porous layer individually. According to embodiments of the disclosure, the porosity of the porous layer can be from about 10 vol % to 95 vol %, such as about 15 vol %, 20 vol %, 25 vol %, 30 vol %, 35 vol %, 40 vol %, 45 vol %, 50 vol %, 55 vol %, 60 vol %, 65 vol %, 70 vol %, 75 vol %, 80 vol %, 85 vol %, or 90 vol %. According to embodiments of the disclosure, the average pore size of the porous layer can be from 100 nm to 5 μm, such as 50 nm to 3 μm, or 500 nm to 3 μm. According to embodiments of the disclosure, the thickness of the porous layer can be from about 1 to 30 μm. According to embodiments of the disclosure, suitable material of the porous layer can be polydimethylsiloxane (PDMS), polyvinylchloride (PVC), polycarbonate (PC), polyacrylic acid (PAA), poly(methyl methacrylate) (PMMA), polyethylene terephthalate (PET), polyacrylonitrile (PAN), polytetrafluoroethylene (PTFE), polyvinylidene fluoride (PVDF), perfluoroalkoxy alkane (PFA), fluorinated ethylene propylene (FEP), poly(vinylidene fluoride-co-hexafluoropropylene) (PVDF-HFP), styrene-butadiene rubber (SBR), nitrile-butadiene rubber (NBR), or a combination thereof.

Figure 9:
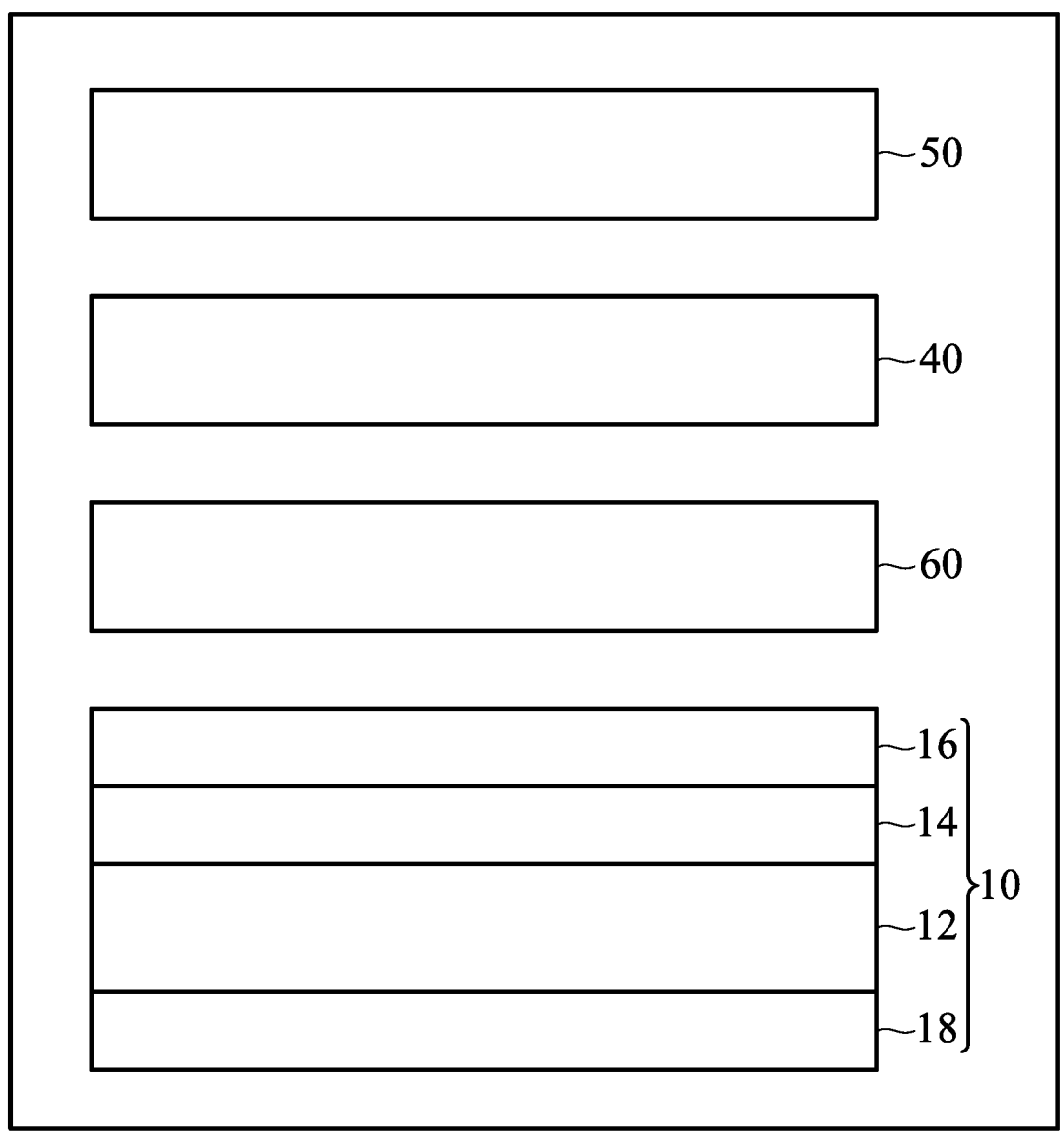
FIG. 9 is a schematic view of the lithium-ion battery according to some embodiments of the disclosure

According to embodiments of the disclosure, the battery of the disclosure can further include a third porous film. FIG. 9 is a schematic view of the lithium-ion battery according to some embodiments of the disclosure. As shown in FIG. 9, besides the negative electrode 10, the solid electrolyte membrane 40, and the positive electrode 50, the battery 100 can further include a third porous film 60. The third porous film 60 is disposed between the solid electrolyte membrane 40 and the negative electrode 10. The third porous film 60 can serve as a buffer layer formed on the surface of the solid electrolyte membrane in order to prevent the solid electrolyte membrane 50 from directly contacting the negative electrode 10. As a result, the solid electrolyte membrane 50 would not be deteriorated by the negative electrode active layer so that the charge-discharge performance of the battery is maintained. Furthermore, the third porous film 60 can stabilize the ion flow, thereby achieving the purpose of inhibiting dendrite growth. Therefore, the third porous film 60 can enhance the interfacial compatibility between the solid electrolyte membrane 40 and the negative electrode 10 and the ionic conductivity of the solid electrolyte membrane 40, thereby improving the stability, increasing the safety in use, and prolonging the life cycle of the battery.

According to embodiments of the disclosure, the thickness of the third porous film 60 can be from about from 1 µm to 500 µm (such as about 10 µm, 50 µm, 100 µm, 200 µm, 300 µm, or 400 µm). If the thickness of the third porous film 60 is too high, the charge-discharge performance of the battery would be deteriorated due to the high interfacial impedance. If the thickness of the third porous film 60 is too low, the interfacial compatibility between the solid electrolyte membrane 40 and negative electrode 10 would not be improved and the purpose of inhibiting dendrite growth would not be achieved. According to embodiments of the disclosure, the third porous film 60 can include polydimethylsiloxane (PDMS), polytetrafluoroethylene (PTFE), polyvinylidene fluoride (PVDF), perfluoroalkoxy alkane (PFA), fluorinated ethylene propylene (FEP), poly(vinylidene fluoride-co-hexafluoropropylene (PVDF-HFP), styrene-butadiene rubber (SBR), nitrile-butadiene rubber (NBR), or a combination thereof.

According to embodiments of the disclosure, the third porous film 60 can be fluorine-containing polymer, such as polytetrafluoroethylene (PTFE), polyvinylidene fluoride (PVDF), perfluoroalkoxy alkane (PFA), fluorinated ethylene propylene (FEP), or polyvinylidene fluoride-co-hexafluoropropylene (PVDF-HFP). Due to the hydrophobicity of the fluorine-containing polymer, the third porous film 60 can reduce the amount of the moisture which passes through the solid electrolyte membrane, thereby avoiding the performance deterioration of the battery.

According to embodiments of the disclosure, the third porous film 60 can have a third porosity, wherein the third porosity can be from about 50 vol % to 70 vol % (such as 55 vol %, 60%, or 65 vol %). According to embodiments of the disclosure, the third porosity can be less than the first porosity and the second porosity in order to stabilize the ion flow. According to embodiments of the disclosure, the third porous film 60 can have a third average pore size, wherein the third average pore size can be from about 1 µm to 5 µm (such as 2 µm, 3 µm, or 4 µm). According to embodiments of the disclosure, the third average pore size can be less than the first average pore size and the second average pore size in order to ensure the dendritic lithium is completely blocked.

Figure 10:
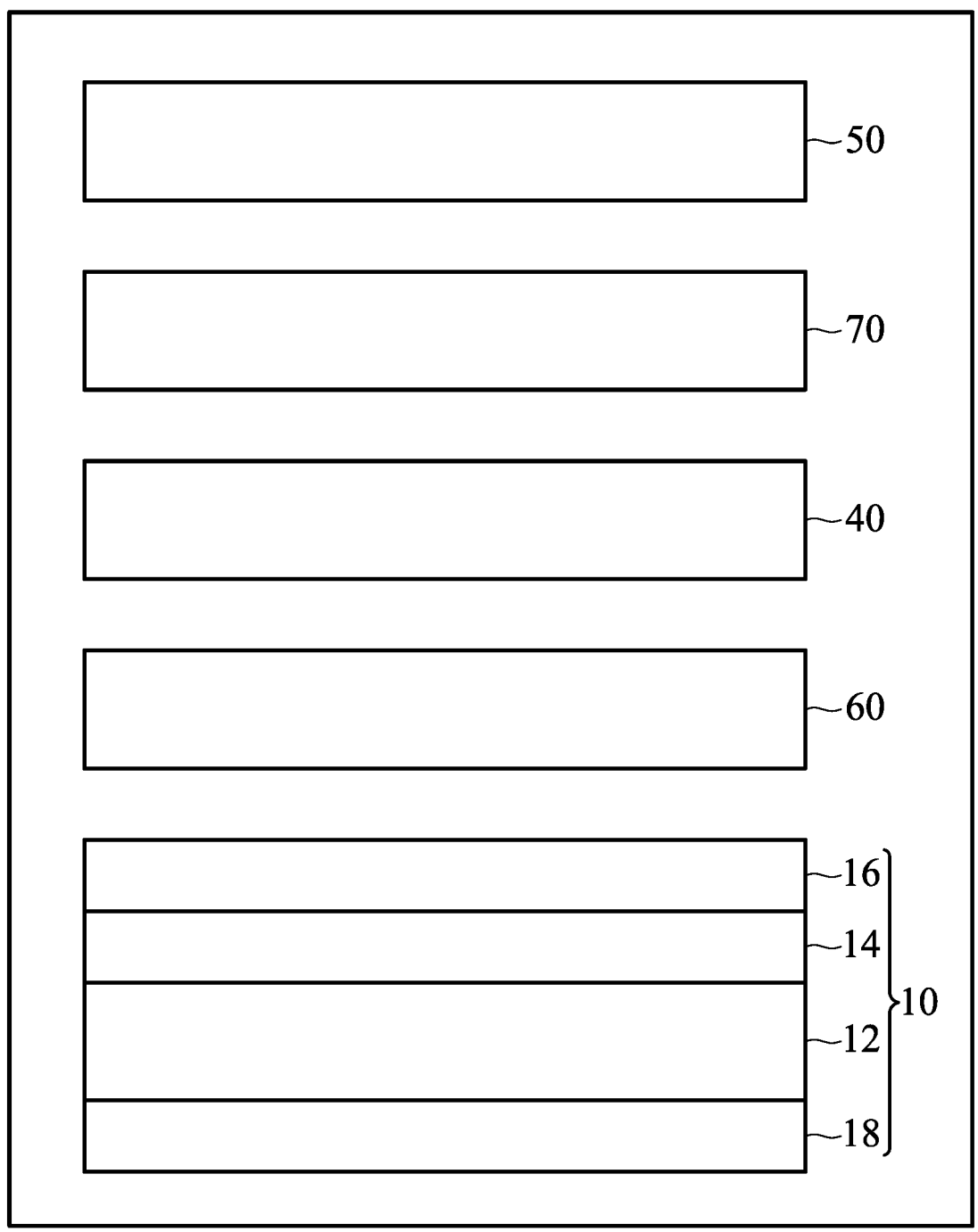
FIG. 10 is a schematic view of the lithium-ion battery according to other embodiments of the disclosure

According to embodiments of the disclosure, the battery of the disclosure can further include a separator. FIG. 10 is a schematic view of the lithium-ion battery 100 according to other embodiments of the disclosure. As shown in FIG. 10, besides the negative electrode 10, the solid electrolyte membrane 40, the third porous film 60, and the positive electrode 50, the battery 100 can further include a separator 70 disposed between the solid electrolyte membrane 40 and the positive electrode 50. According to embodiments of the disclosure, the separator includes insulating material, such as polyethylene (PE), polypropylene (PP), polytetrafluoroethylene film, polyamide film, polyvinyl chloride film, poly (vinylidene fluoride) film, polyaniline film, polyimide film, non-woven fabric, polyethylene terephthalate, polystyrene (PS), cellulose, or a combination thereof. For example, the separator can be PE/PP/PE multilayer composite structure. According to embodiments of the disclosure, the thickness of the separator 70 is not limited and can be optionally modified by a person of ordinary skill in the field. For example, the thickness of the separator 70 can be from about 1 µm to 1,000 µm (such as about 10 µm, 50 µm, 100 µm, 200 µm, 300 µm, 400 µm, 500 µm, 600 µm, 700 µm, 800 µm, or 900 µm).

According to embodiments of the disclosure, the battery can further include an electrolyte liquid (not shown), and the electrolyte liquid is disposed between the positive electrode and the negative electrode. The structure stacked by the positive electrode, separator, solid electrolyte membrane, third porous film, and negative electrode is immersed in the electrolyte liquid. Namely, the battery is filled with the electrolyte liquid. According to some embodiments of the disclosure, the electrolyte liquid can include solvent and lithium-containing compound. According to embodiments of the disclosure, the solvent can be organic solvent, such as ester solvent, ketone solvent, carbonate solvent, ether solvent, alkane solvent, amide solvent, or a combination thereof. According to embodiments of the disclosure, the solvent can be 1,2-diethoxyethane, 1,2-dimethoxyethane, 1,2-dibutoxyethane, tetrahydrofuran, 2-methyl tetrahydrofuran, dimethylacetamide (DMAc), N-methyl-2-pyrrolidone (NMP), methyl acetate, ethyl acetate, methyl butyrate, ethyl butyrate, methyl propionate, ethyl propionate, propyl acetate (PA), γ-butyrolactone (GBL), ethylene carbonate (EC), propylene carbonate (PC), diethyl carbonate (DEC), ethylmethyl carbonate (EMC), dimethyl carbonate (DMC), vinylene carbonate, butylene carbonate, dipropyl carbonate, or a combination thereof. According to embodiments of the disclosure, the lithium-containing compound can be LiPF6, LiClO4, lithium bis(fluorosulfonyl) imide (LiFSI), lithium oxalyldifluoro borate (LiDFOB), $LiBF_4$, $LiSO_3CF_3$, $LiN(SO_2CF_3)_2$, $LiN(SO_2CF_2CF_3)_2$, $LiAsF_6$, $LiSbF_6$, $LiAlCl_4$, $LiGaCl_4$, $LiNO_3$, $LiC(SO_2CF_3)_3$, LiSCN, $LiO_3SCF_2CF_3$, $LiC_6F5SO_3$, $LiO_2CCF_3$, $LiSO_3F$, $LiB(C_6H_5)_4$, $LiB(C_2O_4)_2$ (LiBOB), $LiFePO_4$, $Li_7La_3Zr_2O_{12}$, $LiLaTi_2O_6$, $Li_{2.9}PO_{3.3}N_{0.46}$, $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$, or a combination thereof. In addition, according to some embodiments of the disclosure, the electrolyte composition can include solid electrolyte. The solid electrolyte can be $LiFePO_4$, $Li_7La_3Zr_2O_{12}$, $Li_{2.9}PO_{3.3}N_{0.46}$, $Li_3PO_4$, $Li_{1.3}Al_{0.3}Ti_{0.7}(PO_4)_3$, $Li_{3.6}Si_{0.6}P_{0.4}O_4$, $Li_5La_3Ta_2O_{12}$, or a combination thereof. According to embodiments of the disclosure, the lithium-containing compound concentration of the electrolyte liquid can be from 0.5M to 5M.

According to embodiments of the disclosure, the polymer of the disclosure (such as the polymer used in the first porous film, second porous film, third porous film, binder, separator, or hyper-branched polymer) can have a weight average molecular weight from about 800 to 5,000,000, such as about 1,000, 2,000, 3,000, 5,000, 8,000, 10,000, 10,000, 20,000, 30,000, 50,000, 80,000, 100,000, 200,000, 500,000, 800,000, 1,000,000, 2,000,000, 3,000,000, or 4,000,000.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation of Electrode

Preparation Example 1

First, a polyimide film (with a trade designation of PI20, commercially available from Jiangxi Xiancai nanofiber Technology Co., Ltd) (having a thickness of 45 um, an average pore size of about 5-10 μm, and a porosity ≥70 vol %) was provided. Next, 40 parts by weight of zinc oxide and 8 parts by weight of binder (with a trade designation of PVDF-HFP, commercially available from Sigma-Aldrich) was added in 60 parts by weight of butyl acrylate. After mixing, a composition was obtained. Next, 2 parts by weight of the composition was dispersed in 98 parts by weight of acetone, obtaining a coating composition. Next, the polyimide film was completely immersed in the coating composition, and a zinc oxide layer was formed on the surface of the porous structure of the polyimide film by dip coating (with an average thickness about 1 μm). Next, a gold layer was formed on the surface of the porous structure of a part of the polyimide film by plasma enhanced chemical vapor deposition (PECVD). In the polyimide film, the portion of the polyimide film, which the surface of the porous structure of the polyimide film was covered by the gold layer (i.e. the outermost layer exposed from the porous structure of the polyimide film was gold layer) was defined as the first porous film. In the polyimide film, the portion of the polyimide film, which the surface of the porous structure of the polyimide film was merely covered by the zinc oxide layer (i.e. the outermost layer exposed from the porous structure of the polyimide film was zinc oxide layer) was defined as the second porous film. Herein, the thickness ratio of the first porous film to the second porous film was 1:1, wherein the thickness ratio of the first porous film (i.e. the conductive layer) to the second porous film (i.e. the non-conductive layer) was controlled by the process time period of the plasma enhanced chemical vapor deposition. Finally, the obtained polyimide film was disposed on a lamination consisting of a lithium foil and a copper foil (commercially available from Honjo Metal Co., Ltd.) (with a thickness of 60 μm) (the lithium foil served as the active material layer, and the copper foil served as the current-collecting layer), obtaining Electrode (1). In particular, the first porous film of the polyimide film directly contacted the lithium foil.

Comparative Preparation Example 1

First, a polyimide film (with a trade designation of PI20, commercially available from Jiangxi Xiancai nanofiber Technology Co., Ltd) (having a thickness of 45 um, an average pore size of about 5-10 μm, and a porosity ≥70 vol %) was provided. Next, the polyimide film was disposed on a lamination consisting of a lithium foil and a copper foil (commercially available from Honjo Metal Co., Ltd.) (with a thickness of 60 μm) (the lithium foil served as the active material layer, and the copper foil served as the current-collecting layer), obtaining Electrode (2). In particular, the polyimide film directly contacted the lithium foil.

Comparative Preparation Example 2

First, a polyimide film (with a trade designation of PI20, commercially available from Jiangxi Xiancai nanofiber Technology Co., Ltd) (having a thickness of 45 um, an average pore size of about 5-10 μm, and a porosity ≥70 vol %) was provided. Next, a copper layer (with an average thickness of about 1 μm) was formed on the surface of the porous structure of the whole polyimide film. Finally, the obtained polyimide film was disposed on a lamination consisting of a lithium foil and a copper foil (commercially available from Honjo Metal Co., Ltd.) (with a thickness of 60 μm) (the lithium foil served as the active material layer, and the copper foil served as the current-collecting layer), obtaining Electrode (3). In particular, the polyimide film directly contacted the lithium foil.

In particular, the method for forming a copper layer on the surface of the porous structure of the polyimide film included the following steps. A part of the polyimide film was subjected to an alkaline treatment with a sodium hydroxide aqueous solution (5M) at 55° C., wherein the time period of the alkaline treatment was about 3 minutes. Next, the polyimide film was treated with 10 wt % cleaning conditioner (commercially available from Dow Chemical Company with a trade designation of CC-233) (including 85 wt % and 15 wt % of triethanolamine and ethanolamine) at 50° C. for 1 minute. Next, the polyimide film was subjected with an aqueous solution including palladium chloride (PdCl2) and ammonium chloride (NH4Cl) at room temperature for about 1 minute, wherein the concentration of palladium chloride was 0.4 g/L, and the concentration of ammonium chloride was 0.4 g/L. Next, the polyimide film was subjected to a phosphoric acid sodium (NaH2PO2) aqueous solution (with a concentration of 30.2 g/L) at room temperature for about 1minutes. Next, a part of the polyimide film was subjected to an electroless plating with a copper sulfate aqueous solution (with a concentration of 25 g/L) and formaldehyde (3 wt %, based on the weight of copper sulfate aqueous solution) for about 4 minutes. Next, the polyimide film was subjected to an electroplating with a copper sulfate aqueous solution (with a concentration of 50 g/L) (having hydroethyl cellulose (HEC) (6 ppm) and 3-mercapto-1-propanesulfonate (MPS) (4 ppm)) at room temperature, forming a copper electroplating layer with an average thickness of about 1 μm.

Comparative Preparation Example 3

First, a polyimide film (with a trade designation of PI20, commercially available from Jiangxi Xiancai nanofiber Technology Co., Ltd) (having a thickness of 45 um, an average pore size of about 5-10 μm, and a porosity ≥70 vol %) was provided. Next, 40 parts by weight of zinc oxide and 8 parts by weight of binder polyvinylidene fluoride-co-hexafluoropropylene (PVDF-HFP) (with a molecular weight about 400,000, commercially available from Sigma-Aldrich) was added in 60 parts by weight of butyl acrylate. After mixing, a composition was obtained. Next, 2 parts by weight of the composition was dispersed in 98 parts by weight of acetone, obtaining a coating composition. Next, the polyimide film was completely immersed in the coating composition, and a zinc oxide layer was formed on the surface of the porous structure of the polyimide film by dip coating (with an average thickness about 1 μm). Finally, the obtained polyimide film was disposed on a lamination consisting of a lithium foil and a copper foil (commercially available from Honjo Metal Co., Ltd.) (with a thickness of 60 μm) (the lithium foil served as the active material layer, and the copper foil served as the current-collecting layer), obtaining Electrode (4). In particular, the polyimide film directly contacted the lithium foil.

Comparative Preparation Example 4

First, a polyimide film (with a trade designation of PI20, commercially available from Jiangxi Xiancai nanofiber Technology Co., Ltd) (having a thickness of 45 um, an average pore size of about 5-10 μm, and a porosity ≥70 vol %) was provided. Next, a copper layer (with an average thickness of about 1 μm) was formed on the surface of the porous structure of the whole polyimide film. The method for forming the copper layer was the same as that disclosed in Comparative Preparation Example 2. Next, a gold layer was formed on the surface of the porous structure of a part of the polyimide film by plasma enhanced chemical vapor deposition (covering the copper layer). In the polyimide film, the portion of the polyimide film, which the surface of the porous structure of the polyimide film was covered by the gold layer (i.e. the outermost layer exposed from the porous structure of the polyimide film was gold layer) was defined as the first porous film. In the polyimide film, the portion of the polyimide film, which the surface of the porous structure of the polyimide film was merely covered by the zinc oxide layer (i.e. the outermost layer exposed from the porous structure of the polyimide film was zinc oxide layer) was defined as the second porous film. Herein, the thickness ratio of the first porous film to the second porous film was 1:1, wherein the thickness ratio of the first porous film (i.e. the conductive layer) to the second porous film (i.e. the non-conductive layer) was controlled by the process time period of the plasma enhanced chemical vapor deposition. Finally, the obtained polyimide film was disposed on a lamination consisting of a lithium foil and a copper foil (commercially available from Honjo Metal Co., Ltd.) (with a thickness of 60 μm) (the lithium foil served as the active material layer, and the copper foil served as the current-collecting layer), obtaining Electrode (5). In particular, the first porous film of the polyimide film directly contacted the lithium foil.

Comparative Preparation Example 5

First, a polyimide film (with a trade designation of PI20, commercially available from Jiangxi Xiancai nanofiber Technology Co., Ltd) (having a thickness of 45 um, an average pore size of about 5-10 μm, and a porosity ≥70 vol %) was provided. Next, a copper layer (with an average thickness of about 1 μm) was formed on the surface of the porous structure of the whole polyimide film. The method for forming the copper layer was the same as that disclosed in Comparative Preparation Example 2. Next, a nickel layer was formed on the surface of the porous structure of a part of the polyimide film by plasma enhanced chemical vapor deposition (covering the copper layer). In the polyimide film, the portion of the polyimide film, which the surface of the porous structure of the polyimide film was covered by the nickel layer (i.e. the outermost layer exposed from the porous structure of the polyimide film was nickel layer) was defined as the first porous film. In the polyimide film, the portion of the polyimide film, which the surface of the porous structure of the polyimide film was merely covered by the copper layer (i.e. the outermost layer exposed from the porous structure of the polyimide film was copper layer) was defined as the second porous film. Herein, the thickness ratio of the first porous film to the second porous film was 1:1, wherein the thickness ratio of the first porous film (i.e. the conductive layer) to the second porous film (i.e. the non-conductive layer) was controlled by the process time period of the plasma enhanced chemical vapor deposition. Finally, the obtained polyimide film was disposed on a lamination consisting of a lithium foil and a copper foil (commercially available from Honjo Metal Co., Ltd.) (with a thickness of 60 μm) (the lithium foil served as the active material layer, and the copper foil served as the current-collecting layer), obtaining Electrode (6). In particular, the first porous film of the polyimide film directly contacted the lithium foil.

Comparative Preparation Example 6

First, a polyimide film (with a trade designation of PI20, commercially available from Jiangxi Xiancai nanofiber Technology Co., Ltd) (having a thickness of 45 um, an average pore size of about 5-10 μm, and a porosity ≥70 vol %) was provided. Next, 40 parts by weight of aluminum oxide and 8 parts by weight of binder polyvinylidene fluoride-co-hexafluoropropylene (PVDF-HFP) (with a molecular weight about 400,000, commercially available from Sigma-Aldrich) was added in 60 parts by weight of butyl acrylate. After mixing, a composition was obtained. Next, 2 parts by weight of the composition was dispersed in 98 parts by weight of acetone, obtaining a coating composition. Next, the polyimide film was completely immersed in the coating composition, and an aluminum oxide layer (with an average thickness about 1 μm) was formed on the surface of the porous structure of the polyimide film by dip coating. Next, a copper layer (with an average thickness about 1 μm) was formed on the surface of the porous structure of a part of the polyimide film, wherein the copper layer was formed on the aluminum oxide. The method for forming the copper layer was the same as that disclosed in Comparative Preparation Example 2. In the polyimide film, the portion of the polyimide film, which the surface of the porous structure of the polyimide film was covered by the copper layer (i.e. the outermost layer exposed from the porous structure of the polyimide film was copper layer) was defined as the first porous film. In the polyimide film, the portion of the polyimide film, which the surface of the porous structure of the polyimide film was merely covered by the aluminum oxide (i.e. the outermost layer exposed from the porous structure of the polyimide film was aluminum oxide) was defined as the second porous film. Herein, the thickness ratio of the first porous film to the second porous film was 1:1. Finally, the obtained polyimide film was disposed on a lamination consisting of a lithium foil and a copper foil (commercially available from Honjo Metal Co., Ltd.) (with a thickness of 60 μm) (the lithium foil served as the active material layer, and the copper foil served as the current-collecting layer), obtaining Electrode (7). In particular, the first porous film of the polyimide film directly contacted the lithium foil.

Preparation Example 2

First, a polyimide film (with a trade designation of PI20, commercially available from Jiangxi Xiancai nanofiber Technology Co., Ltd) (having a thickness of 45 um, an average pore size of about 5-10 μm, and a porosity ≥70 vol %) was provided. Next, 40 parts by weight of zinc oxide and 8 parts by weight of binder polyvinylidene fluoride-co-hexafluoropropylene (PVDF-HFP) (with a molecular weight about 400,000, commercially available from Sigma-Aldrich) was added in 60 parts by weight of butyl acrylate. After mixing, a composition was obtained. Next, 2 parts by weight of the composition was dispersed in 98 parts by weight of acetone, obtaining a coating composition. Next, the polyimide film was completely immersed in the coating composition, and an zinc oxide layer (with an average thickness about 1 μm) was formed on the surface of the porous structure of the polyimide film by dip coating. Next, a gold layer was formed on the surface of the porous structure of a part of the polyimide film by plasma enhanced chemical vapor deposition (covering the zinc oxide layer). In the polyimide film, the portion of the polyimide film, which the surface of the porous structure of the polyimide film was covered by the gold layer (i.e. the outermost layer exposed from the porous structure of the polyimide film was gold layer) was defined as the first porous film. In the polyimide film, the portion of the polyimide film, which the surface of the porous structure of the polyimide film was merely covered by the zinc oxide (i.e. the outermost layer exposed from the porous structure of the polyimide film was zinc oxide) was defined as the second porous film. Herein, the thickness ratio of the first porous film to the second porous film was 1:1, wherein the thickness ratio of the first porous film (i.e. the conductive layer) to the second porous film (i.e. the non-conductive layer) was controlled by the process time period of the plasma enhanced chemical vapor deposition. Finally, the obtained polyimide film was disposed on a lamination consisting of a lithium foil and a copper foil (commercially available from Honjo Metal Co., Ltd.) (with a thickness of 60 μm) (the lithium foil served as the active material layer, and the copper foil served as the current-collecting layer), obtaining Electrode (8). In particular, the first porous film of the polyimide film directly contacted the lithium foil.

Preparation of Battery

Example 1

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (1) of Preparation Example 1. Next, a separator (available under the trade designation of Celgard 2320) was provided. Next, the negative electrode, the separator and the positive electrode were placed in sequence (wherein the lithium foil of the positive electrode was oriented toward the separator, and the second porous film of the negative electrode was oriented toward the separator) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (1). Next, the nucleation voltage and the deposition voltage difference of the battery were measured, and the results are shown in Table 3. The method for measuring the nucleation voltage and deposition voltage difference were disclosed below. The battery was charged and discharged at a fixed density 0.1 mAcm$^{-2}$ for 20 hours, the nucleation voltage was the initial voltage during charging in the cycle. The deposition voltage difference was the difference between the median voltage and the nucleation voltage during charging.

Next, after several cycles of charging and discharging Battery (1), the negative electrode of Battery (1) was analyzed by scanning electron microscope (SEM). Since Battery (1) employed the electrode with the specific structure of the disclosure, the negative electrode of Battery (1) exhibits smooth lithium deposition (the formation of needle-like dendrites was inhabited), and a light volume swelling issue was observed.

Comparative Example 1

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a negative electrode. Next, a separator (available under the trade designation of Celgard 2320) was provided. Next, the negative electrode, the separator and the positive electrode were placed in sequence (wherein the lithium foil of the positive electrode was oriented toward the separator, and the lithium foil of the negative electrode was oriented toward the separator) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (2). Next, the nucleation voltage and the deposition voltage difference of the battery were measured, and the results are shown in Table 3.

Next, after several cycles of charging and discharging Battery (2), the negative electrode of Battery (2) was analyzed by scanning electron microscope (SEM). Since the negative electrode merely included the active material layer rather than further including the specific structure (i.e. the conductive layer and the non-conductive layer) of the disclosure, the formation of needle-like dendrites and dead lithium (such as cracked dendrites) was observed, thereby generating an undesired deposition morphology of lithium. In addition, an obvious volume swelling issue of the negative electrode in Battery (2) was observed.

Comparative Example 2

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (2) of Comparative Preparation Example 1. Next, a separator (available under the trade designation of Celgard 2320) was provided. Next, the negative electrode, the separator and the positive electrode were placed in sequence (wherein the lithium foil of the positive electrode was oriented toward the separator, and the negative electrode 的 polyimide film was oriented toward the separator) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (3). Next, the nucleation voltage and the deposition voltage difference of the battery were measured, and the results are shown in Table 3.

Next, after several cycles of charging and discharging Battery (3), the negative electrode of Battery (3) was analyzed by scanning electron microscope (SEM). Since the polyimide film of the negative electrode was not covered by any lithiophilic material, the formation of needle-like dendrites and dead lithium (such as cracked dendrites) was observed, thereby generating an undesired deposition morphology of lithium.

Comparative Example 3

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (3) of Comparative Preparation Example 2. Next, a separator (available under the trade designation of Celgard 2320) was provided. Next, the negative electrode, the separator and the positive electrode were placed in sequence (wherein the lithium foil of the positive electrode was oriented toward the separator, and the polyimide film (including copper) of the negative electrode was oriented toward the separator) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (4). Next, the nucleation voltage and the deposition voltage difference of the battery were measured, and the results are shown in Table 3.

Next, after several cycles of charging and discharging Battery (4), the polyimide film (which copper covered the surface of the porous structure of the polyimide film) of the negative electrode of Battery (4) was analyzed by scanning electron microscope (SEM). Since the surface of the porous structure of the polyimide film in the negative electrode was non-lithiophilic conductive layer (copper layer), needle-like dendrites were apt to be deposited on the top portion of the polyimide film, thereby generating an undesired deposition morphology of lithium.

Comparative Example 4

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (4) of Comparative Preparation Example 3. Next, a separator (available under the trade designation of Celgard 2320) was provided. Next, the negative electrode, the separator and the positive electrode were placed in sequence (wherein the lithium foil of the positive electrode was oriented toward the separator, and the polyimide film (including zinc oxide) of the negative electrode was oriented toward the separator) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (5). Next, the nucleation voltage and the deposition voltage difference of the battery were measured, and the results are shown in Table 3.

Next, after several cycles of charging and discharging Battery (5), the polyimide film (which zinc oxide covered the surface of the porous structure of the polyimide film) of the negative electrode of Battery (5) was analyzed by scanning electron microscope (SEM). Since the polyimide film of the negative electrode was merely covered by the non-conductive lithiophilic material, the non-uniform lithium deposition was observed.

Comparative Example 5

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (5) of Comparative Preparation Example 4. Next, a separator (available under the trade designation of Celgard 2320) was provided. Next, the negative electrode, the separator and the positive electrode were placed in sequence (wherein the lithium foil of the positive electrode was oriented toward the separator, and the second porous film of the negative electrode was oriented toward the separator) and sealed within a cell, and then an electrolyte liquid (including lithium bis(trifluoromethanesulfonyl) imide (LiTF SI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (6). Next, the nucleation voltage and the deposition voltage difference of the battery were measured, and the results are shown in Table 3.

Next, after several cycles of charging and discharging Battery (6), the polyimide film (which gold covered the surface of the porous structure of the polyimide film) of the negative electrode of Battery (6) was analyzed by scanning electron microscope (SEM). Needle-like dendrites were deposited on the top portion (i.e. the second porous film) of the polyimide film, thereby generating an undesired deposition morphology of lithium.

Comparative Example 6

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (6) of Comparative Preparation Example 5. Next, a separator (available under the trade designation of Celgard 2320) was provided. Next, the negative electrode, the separator and the positive electrode were placed in sequence (wherein the lithium foil of the positive electrode was oriented toward the separator, and the second porous film of the negative electrode was oriented toward the separator) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (7). Next, the nucleation voltage and the deposition voltage difference of the battery were measured, and the results are shown in Table 3.

Comparative Example 7

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (7) of Comparative Preparation Example 6. Next, a separator (available under the trade designation of Celgard 2320) was provided. Next, the negative electrode, the separator and the positive electrode were placed in sequence (wherein the lithium foil of the positive electrode was oriented toward the separator, and the second porous film of the negative electrode was oriented toward the separator) and sealed within a cell, and then an electrolyte liquid (including lithium bis(trifluoromethanesulfonyl) imide (LiTF SI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (8). Next, the nucleation voltage and the deposition voltage difference of the battery were measured, and the results are shown in Table 3.

Comparative Example 8

Tetraethylene glycol dimethyl ether (TEGDME) and lithium bis(trifluoromethylsulfonyl) imide (LiTFSI) were mixed, obtaining a mixture, wherein the molar ratio of TEGDME to LiTFSI was 1:1. Next, the mixture was mixed with silicon dioxide powder (commercially available from Degussa with a trade designation of Aerosil 812), obtaining a quasi-solid-state electrolyte (wherein the volume ratio of the mixture to silicon dioxide powder was 1:1). Next, 60 parts by weight of $Li_7La_3Zr_2O_{12}$ was mixed with 40 parts by weight of quasi solid-state electrolyte, and then 7 parts by weight of polytetrafluoroethylene (PTFE) powder was added thereto. After compression molding, a composite film (LLZOGS) (with a thickness of 200 μm) was obtained. Next, two porous polytetrafluoroethylene (PTFE) films (commercially available from EF-Materials Industries Inc. with a trade designation of EFMaflon) (with an average pore size of 0.45 μm and a thickness of 30 μm) were provided. Next, the composite film (LLZOGS) was disposed between the two porous polytetrafluoroethylene (PTFE) films (i.e. forming a lamination represented by PTFE/LLZOGS/PTFE). Next, the lamination was subjected to a compression process at 150° C., obtaining a solid electrolyte membrane (with a thickness about less than or equal to 50 μm). Next, 10 parts by weight polyvinylidene fluoride-co-hexafluoropropylene (PVDF-HFP) (with a molecular weight about 400,000, commercially available from Sigma-Aldrich) and 5 parts by weight of water were added into 85 parts by weight of acetone, obtaining a coating composition after uniformly mixing. Next, the coating composition was coated on the solid electrolyte membrane by blade coating. After drying at 80° C., a polyvinylidene fluoride-co-hexafluoropropylene (PVDF-HFP) film (serving as the third porous film) was disposed on the solid electrolyte membrane. A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a negative electrode. Next, a separator (available under the trade designation of Celgard 2320) was provided. Next, the negative electrode, the third porous film, the solid electrolyte membrane, the separator and the positive electrode were placed in sequence (wherein the lithium foil of the positive electrode was oriented toward the separator, and the second porous film of the negative electrode was oriented toward the third porous film) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (9). Next, the nucleation voltage and the deposition voltage difference of the battery were measured, and the results are shown in Table 3.

Next, after several cycles of charging and discharging Battery (9), the lithium active layer of the negative electrode of Battery (9) was analyzed by scanning electron microscope (SEM). Due to the third porous film and the solid electrolyte membrane, the formation of needle-like dendrites in Battery (9) was inhibited even though Battery (9) did not include the specific negative electrode of the disclosure. Nevertheless, an obvious volume swelling issue (with a volume expansion rate of 100%) of the negative electrode in Battery (9) was observed since the negative electrode since the negative electrode of Battery (9) did not include the specific structure and components of the disclosure.

Example 2

The third porous film and the solid electrolyte membrane disclosed in Comparative Example 8 were provided. Next, A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (1) of Preparation Example 1. Next, a separator (available under the trade designation of Celgard 2320) was provided. Next, the negative electrode, the third porous film, the solid electrolyte membrane, the separator and the positive electrode were placed in sequence (wherein the lithium foil of the positive electrode was oriented toward the separator, and the second porous film of the negative electrode was oriented toward the third porous film) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (10). Next, the nucleation voltage and the deposition voltage difference of the battery were measured, and the results are shown in Table 3.

Next, after several cycles of charging and discharging Battery (10), the lithium active layer of the negative electrode of Battery (10) was analyzed by scanning electron microscope (SEM). Since Battery (10) employed the electrode with the specific structure of the disclosure, the third porous film and the solid electrolyte membrane, the smooth lithium deposition on the negative electrode of battery (10) was observed (i.e. the formation of needle-like dendrites was inhibited), and a light volume swelling issue was observed (with a volume expansion rate about 25%).

Example 3

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (8) of Preparation Example 2. A separator (available under the trade designation of Celgard 2320) was provided. Next, the negative electrode, the separator and the positive electrode were placed in sequence (wherein the lithium foil of the positive electrode was oriented toward the separator, and the second porous film of the negative electrode was oriented toward the separator) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (11). Next, the nucleation voltage and the deposition voltage difference of the battery were measured, and the results are shown in Table 3.

TABLE 3

| | nucleation voltage (mV) | deposition voltage difference (mV) |
| --- | --- | --- |
| Example 1 | 18.1 | 10.1 |
| Comparative Example 1 | 76.2 | 25.3 |
| Comparative Example 2 | 21.3 | 24.7 |
| Comparative Example 3 | 55.3 | 22.7 |
| Comparative Example 4 | 10.7 | 24.7 |
| Comparative Example 5 | 39.7 | 21.6 |
| Comparative Example 6 | 26.1 | 4.9 |
| Comparative Example 7 | 21.6 | 3.6 |
| Comparative Example 8 | 30.4 | 9.7 |
| Example 2 | 15.0 | 6.0 |
| Example 3 | 11.9 | 0.8 |

The nucleation voltage depends on the distribution of lithium deposition. When the nucleation voltage is high, lithium deposition is centralized rather than being distributed. The deposition voltage difference depends on the accumulation of lithium deposition. When the deposition voltage difference is high, lithium is deposited perpendicularly. When the deposition voltage difference is low, lithium is deposited horizontally. As shown in Table 3, since the batteries of Examples 1-3 employ the negative electrode with specific structure of the disclosure, the deposition morphology of lithium can be altered, and the nucleation voltage and deposition voltage difference can be reduced, resulting from the structure constituted by the porous conductive layer and the non-conductive layer and the specific lithiophilic material within the conductive layer and non-conductive layer. As a result, dendrite growth can be inhibited and the problem of battery swelling during battery charging and discharging can be improved, thereby prolonging the lifespan of lithium-ion battery. In addition, as shown in Examples 1 and 2, when the negative electrode is used in concert with the third porous film and the solid electrolyte membrane, the deposition voltage difference of the obtained battery can be improved, resulting in that lithium is further deposited in the horizontal direction.

Figure 11:
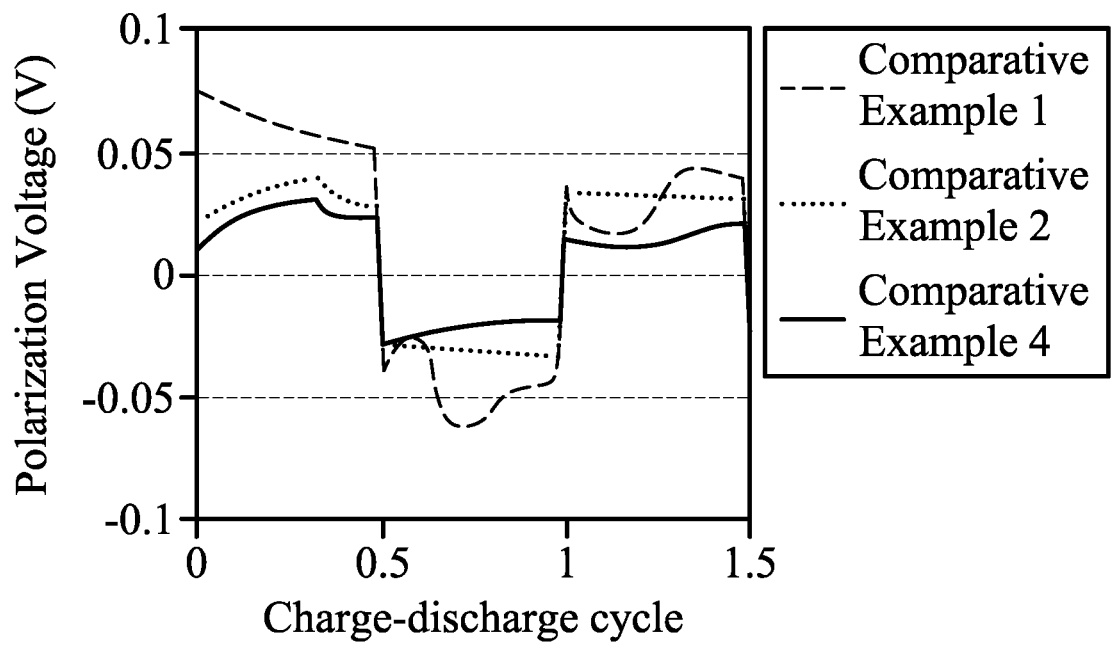
FIG. 11 is a graph plotting the polarization voltage of the battery of Comparative Example 1, Comparative Example 2, and Comparative Example 4 against charge-discharge cycle.

FIG. 11 is a graph plotting the polarization voltage of the battery of Comparative Example 1, Comparative Example 2, and Comparative Example 4 against charge-discharge cycle (measured under a current density of 0.1 mA/cm2). In comparison with the negative electrode of Comparative Example 1, the negative electrode of Comparative Example 2 further included a polyimide film. As shown in FIG. 11 and Table 3, the polyimide film can improve the nucleation voltage. As a result, the distribution of lithium deposition is uniform. In comparison with the negative electrode of Comparative Example 2, the negative electrode of Comparative Example 4 further included a non-conductive lithiophilic material formed to cover the surface of the porous structure of the polyimide film. Thus, the nucleation voltage can be further improved.

Figure 12:
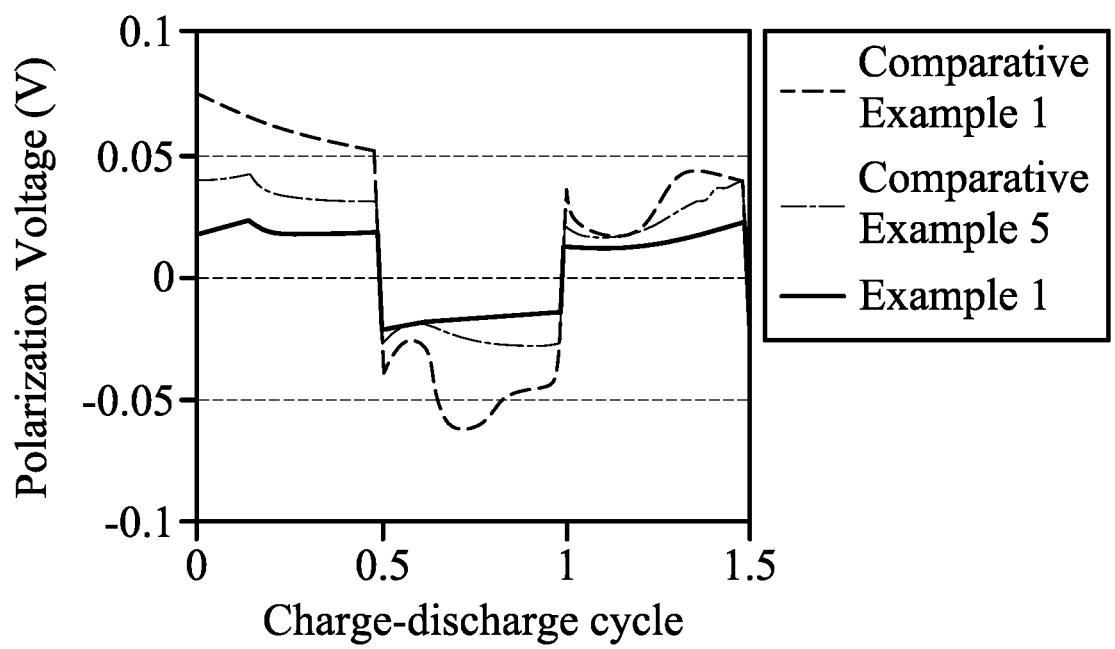
FIG. 12 is a graph plotting the polarization voltage of the battery of Comparative Example 1, Comparative Example 5, and Example 1 against charge-discharge cycle.

FIG. 12 is a graph plotting the polarization voltage of the battery of Comparative Example 1, Comparative Example 5, and Example 1 against charge-discharge cycle (measured under a current density of 0.1 mA/cm2). Since the second porous film of the negative electrode of Comparative Example 5 included the non-lithiophilic material (i.e. copper), the battery of Comparative Example 5 exhibit relatively high nucleation voltage and deposition voltage difference in comparison with Example 1. It means that needle-like dendrites and dead lithium are formed on the negative electrode of the battery of Comparative Example 5.

Figure 13:
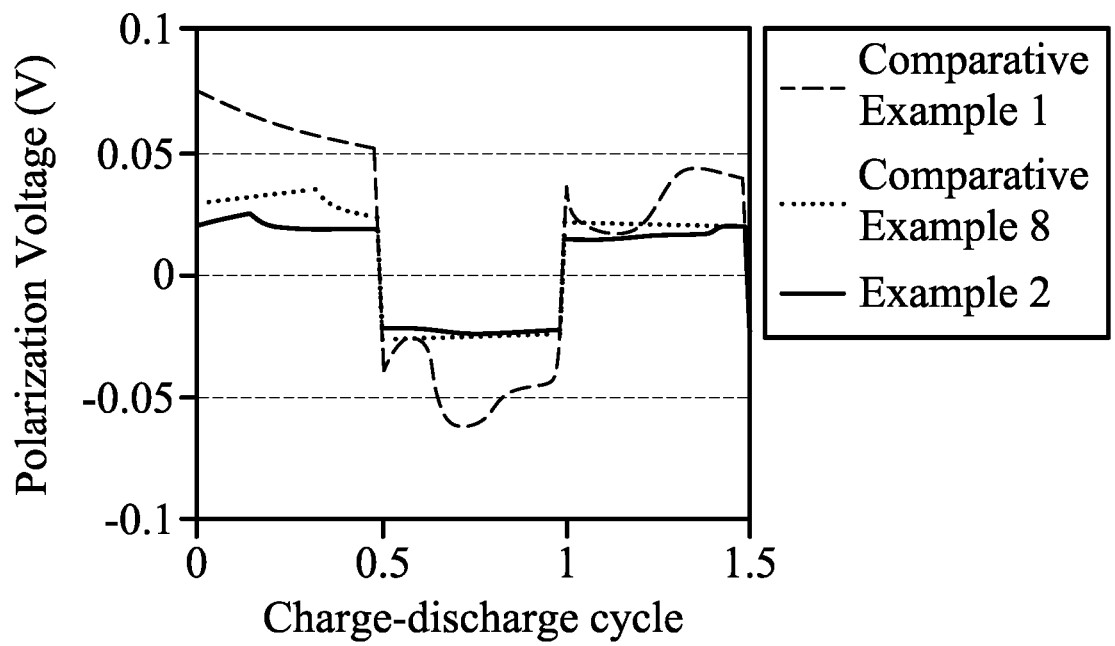
FIG. 13 is a graph plotting the polarization voltage of the battery of Comparative Example 1, Comparative Example 8, and Example 2 against charge-discharge cycle.

FIG. 13 is a graph plotting the polarization voltage of the battery of Comparative Example 1, Comparative Example 8, and Example 2 against charge-discharge cycle (measured under a current density of 0.1 mA/cm2). In comparison with Comparative Example 8, the battery of Example 2 exhibits low nucleation voltage since the battery of Example employs the negative electrode of the disclosure.

Figure 14:
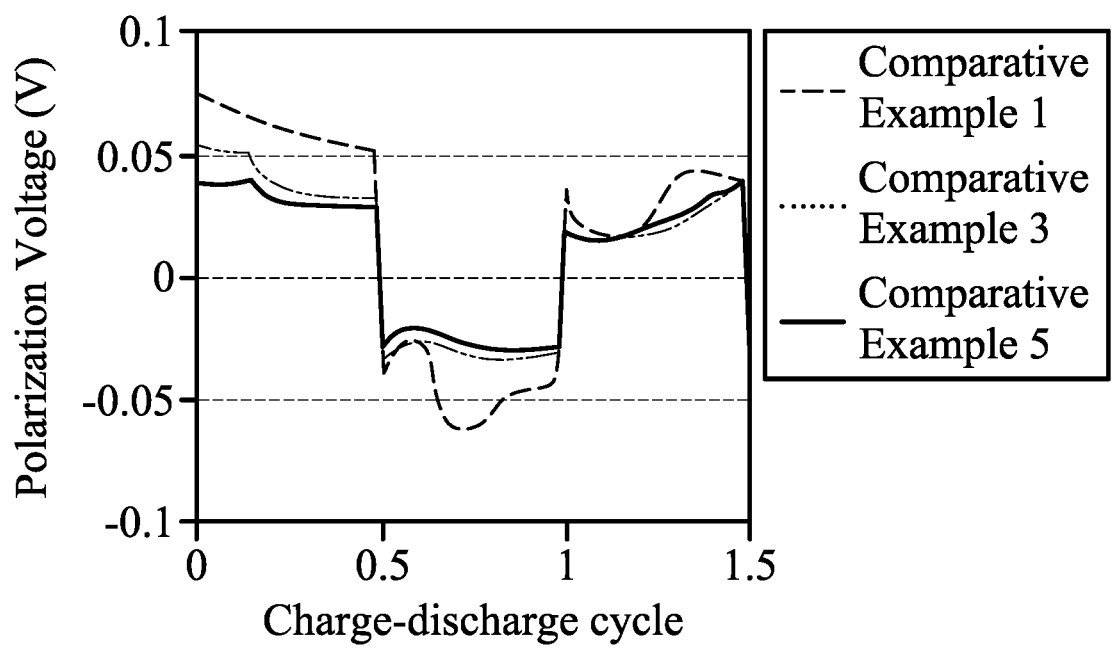
FIG. 14 is a graph plotting the polarization voltage of the battery of Comparative Example 1, Comparative Example 3, and Comparative Example 5 against charge-discharge cycle.

FIG. 14 is a graph plotting the polarization voltage of the battery of Comparative Example 1, Comparative Example 3, and Comparative Example 5 against charge-discharge cycle (measured under a current density of 0.1 mA/cm2). Although the negative electrode of Comparative Example 3 and 5 include polyimide film (covered by copper or covered by copper and gold), the batteries of Comparative Examples 3 and 5 exhibit high nucleation voltage and deposition voltage difference, as shown in FIG. 14 and Table 3. It means that needle-like dendrites and dead lithium are formed on the negative electrode of the battery.

Figure 15:
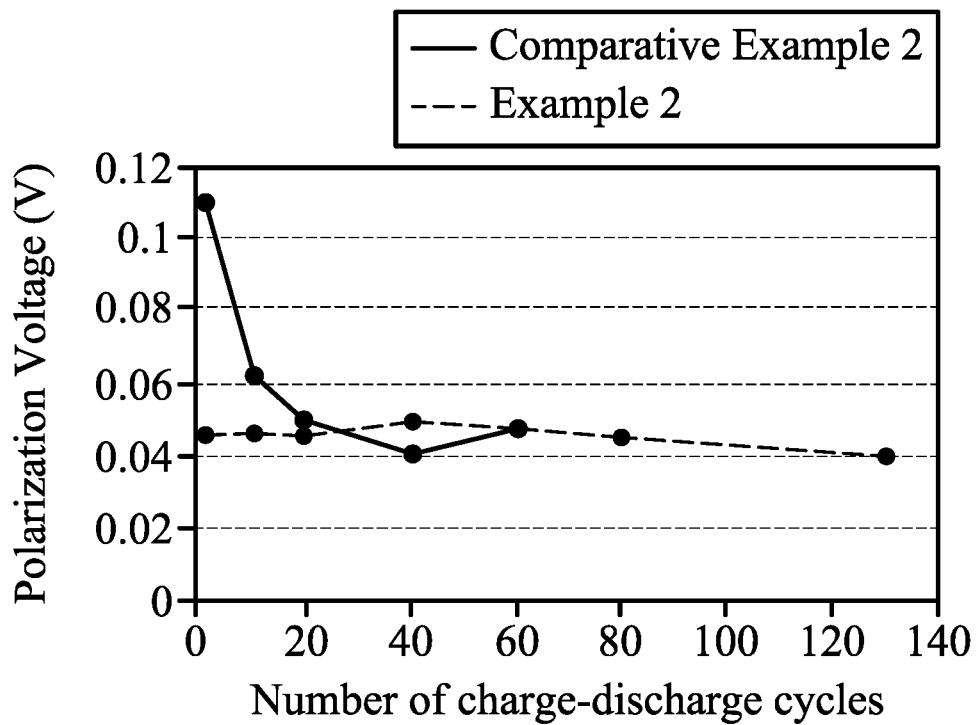
FIG. 15 is a graph plotting the polarization voltage of the battery of Comparative Example 2 and Example 2 against number of charge-discharge cycles.

FIG. 15 is a graph plotting the polarization voltage of the battery of Comparative Example 2 and Example 2 against number of charge-discharge cycles (measured under a current density of 0.5 mA/cm2). Since the negative electrode of the battery of Comparative Example 2 does not include lithiophilic material layer, the battery exhibits high initial polarization voltage. In comparison with Comparative Example 2, since the battery of Example 2 employs the negative electrode of the disclosure, which is further used in concert with the third porous film and the solid electrolyte membrane, the battery of Example 2 exhibits low initial polarization voltage and stable polarization voltage.

Figure 16:
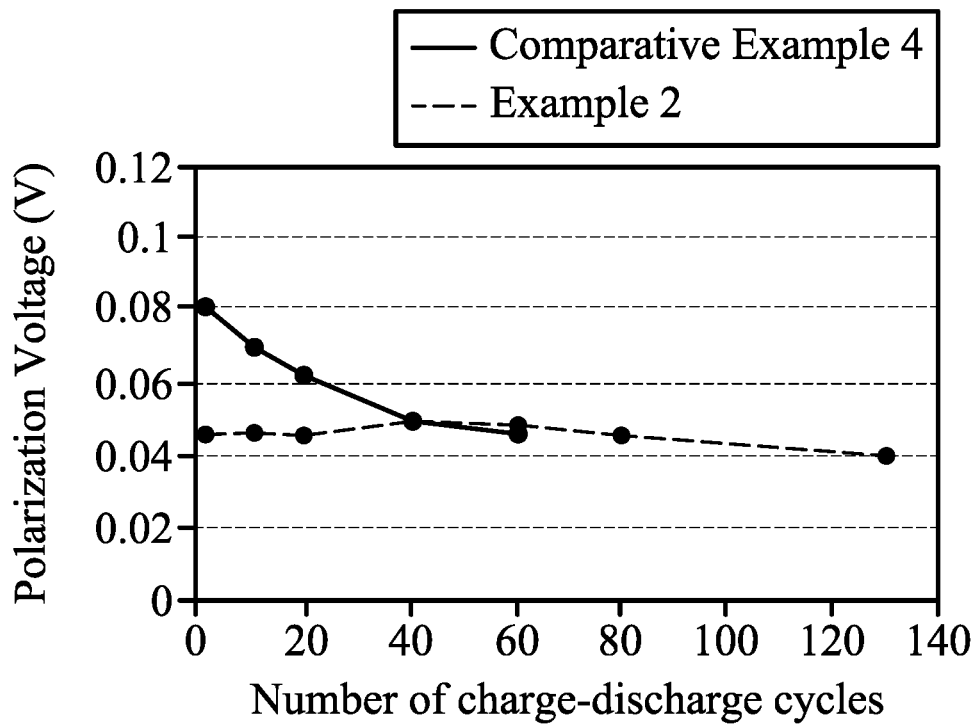
FIG. 16 is a graph plotting the polarization voltage of the battery of Comparative Example 4 and Example 2 against number of charge-discharge cycles.

FIG. 16 is a graph plotting the polarization voltage of the battery of Comparative Example 4 and Example 2 against number of charge-discharge cycles (measured under a current density of 0.5 mA/cm2). The negative electrode of Comparative Example 4 includes lithiophilic material, but does not include a conductive layer disposed above the active material layer. Therefore, the battery of Comparative Example 4 exhibits high initial polarization voltage.

Figure 17:
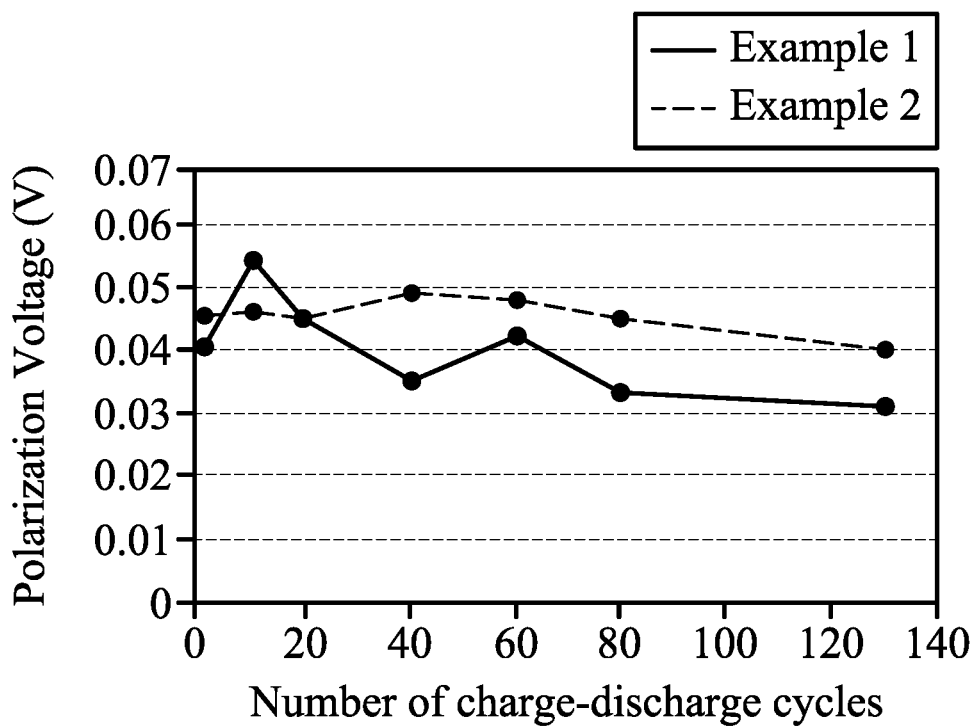
FIG. 17 is a graph plotting the polarization voltage of the battery of Example 1 and Example 2 against number of charge-discharge cycles.

FIG. 17 is a graph plotting the polarization voltage of the battery of Example 1 and Example 2 against number of charge-discharge cycles (measured under a current density of 0.5 mA/cm2). In comparison with Example 1, the negative electrode of the battery in Example 2 is used in concert with the third porous film and the solid electrolyte membrane. Therefore, the battery of Example 2 exhibit low initial polarization voltage and more stable polarization voltage.

Figure 18:
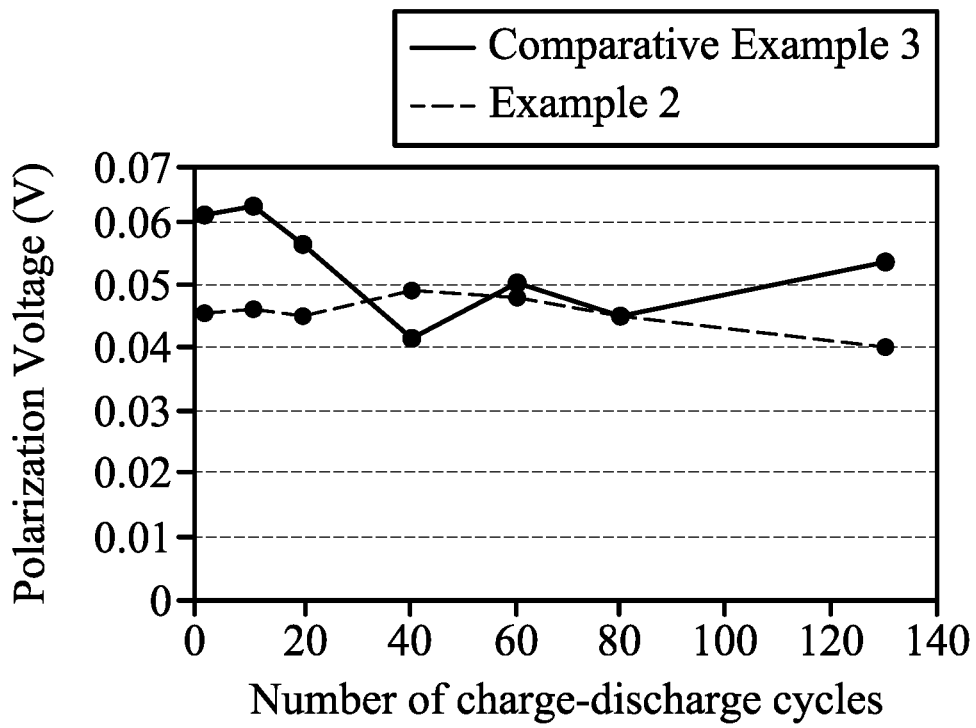
FIG. 18 is a graph plotting the polarization voltage of the battery of Comparative Example 3 and Example 2 against number of charge-discharge cycles.

FIG. 18 is a graph plotting the polarization voltage of the battery of Comparative Example 3 and Example 2 against number of charge-discharge cycles (measured under a current density of 0.5 mA/cm2). The negative electrode of the battery in Comparative Example 3 includes copper, but does not include the lithiophilic material layer.

Therefore, the battery of Comparative Example 3 exhibits high initial polarization voltage. In the negative electrode of the battery in Comparative Example 3, the whole polyimide film is covered by the non-lithiophilic conductive material (i.e. copper). Moreover, the negative electrode of the battery in Comparative Example 3 does not be further used in concert with the third porous film and the solid electrolyte membrane. Therefore, the fluctuating range of polarization voltage is violent.

Figure 19:
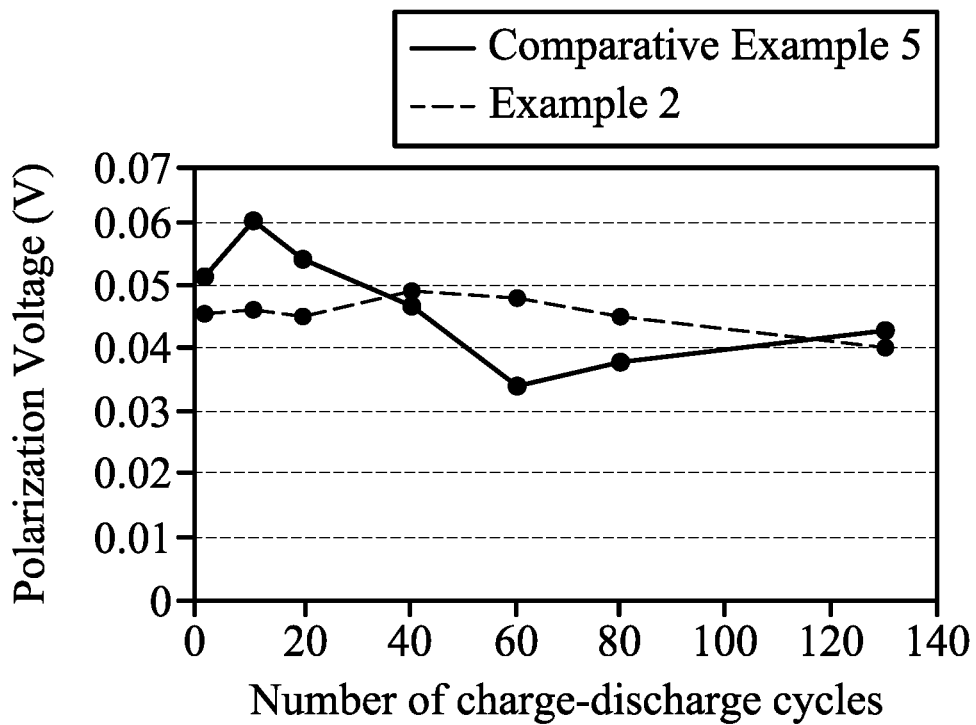
FIG. 19 is a graph plotting the polarization voltage of the battery of Comparative Example 5 and Example 2 against number of charge-discharge cycles.

FIG. 19 is a graph plotting the polarization voltage of the battery of Comparative Example 5 and Example 2 against number of charge-discharge cycles (measured under a current density of 0.5 mA/cm2). The negative electrode of the battery in Comparative Example 5 includes the lithiophilic conductive layer (i.e. gold layer), but does not employ lithiophilic non-conductive material layer. Moreover, the negative electrode of the battery in Comparative Example 5 does not further include the third porous film and the solid electrolyte membrane. Therefore, the fluctuating range of polarization voltage is violent.

Figure 20:
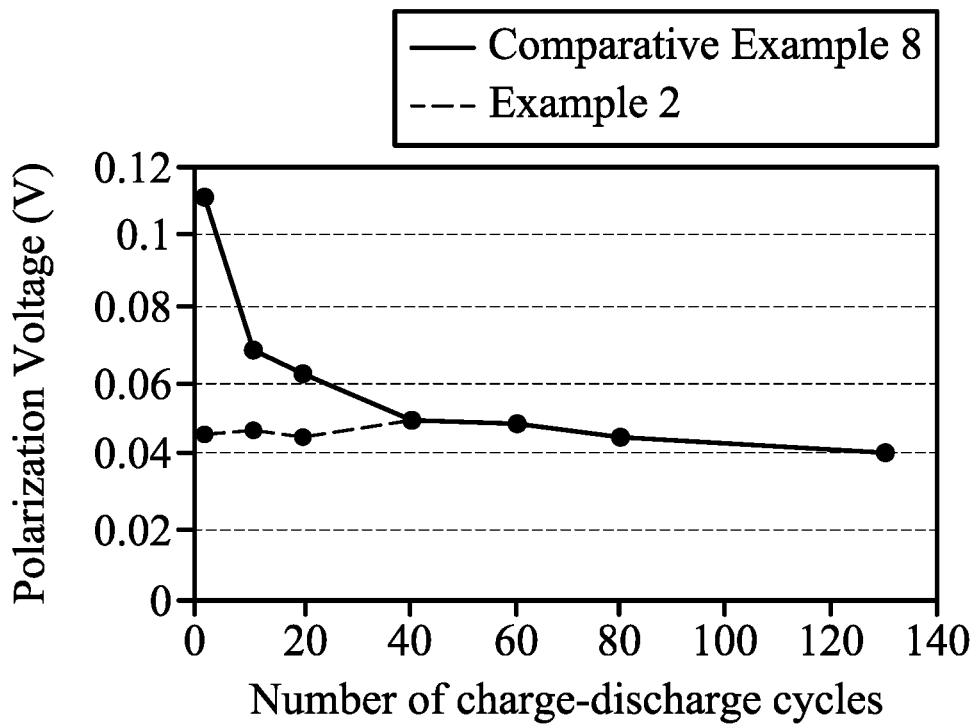
FIG. 20 is a graph plotting the polarization voltage of the battery of Comparative Example 8 and Example 2 against number of charge-discharge cycles.

FIG. 20 is a graph plotting the polarization voltage of the battery of Comparative Example 8 and Example 2 against number of charge-discharge cycles. The negative electrode of the battery of Comparative Example 8 employs the third porous film and the solid electrolyte membrane, but does not include the specific structure of the disclosure (i.e. the negative electrode of the battery of Comparative Example 8 does not include the conductive layer and the non-conductive layer). Therefore, the battery of Comparative Example 8 exhibits high initial polarization voltage.

Comparative Example 9

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a copper foil (commercially available from Jx Nippon Mining & Metals Corporation, with a thickness of 10 μm) was provided to serve as a negative electrode. Next, a separator (available under the trade designation of Celgard 2320) was provided. Next, the negative electrode, the separator and the positive electrode were placed in sequence (wherein the lithium foil of the positive electrode was oriented toward the separator) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (12). The Coulombic efficiency of Battery (12) is shown in Table 4.

Example 4

A lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (1) of Preparation Example 1 except that the negative electrode lacked a lithium active material layer (i.e. the polyimide film was formed directly on the copper foil). Next, a separator (available under the trade designation of Celgard 2320) was provided. Next, the negative electrode, the separator and the positive electrode were placed in sequence (wherein the lithium foil of the positive electrode was oriented toward the separator, and the second porous film of the negative electrode was oriented toward the separator) and sealed within a cell, and then an electrolyte liquid (including lithium bis(trifluoromethanesulfonyl) imide (LiTF SI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (13). The Coulombic efficiency of Battery (13) is shown in Table 4.

Example 5

The third porous film and the solid electrolyte membrane of Comparative Example 8 were provided. Next, a lamination consisting of a lithium foil and a copper foil (commercially available from Honjo Metal Co., Ltd.) (with a thickness of 60 μm) (the lithium foil served as the active material layer, and the copper foil served as the current-collecting layer) was provided to serve as a positive electrode. Next, a negative electrode was provided, wherein the negative electrode was Electrode (1) of Preparation Example 1 except that the negative electrode lacked a lithium active material layer (i.e. the polyimide film was formed directly on the copper foil). Next, a separator (available under the trade designation of Celgard 2320) was provided. Next, the negative electrode, the third porous film, the solid electrolyte membrane, the separator and the positive electrode were placed in sequence (wherein the lithium foil of the positive electrode was oriented toward the separator, and the second porous film of the negative electrode was oriented toward the third porous film) and sealed within a cell, and then an electrolyte liquid (including lithium bis(trifluoromethanesulfonyl) imide (LiTFSI), lithium bis(oxalato) borate (LiBOB) and solvent, wherein the solvent included ethylene carbonate (EC) and diethyl carbonate (DEC) (the volume ratio of EC to DEC was 1:1); the concentration of LiTFSI was 0.6M, the concentration of LiBOB was 0.4M) was injected into the cell, obtaining Battery (14). The Coulombic efficiency of Battery (14) is shown in Table 4.

TABLE 4

|  | Coulombic efficiency (%) |
| --- | --- |
| Comparative Example 9 | 91.9 |
| Example 4 | 92.4 |
| Example 5 | 97.5 |

Since the battery in Example 4 employs the negative electrode with the specific structure of the disclosure, the Coulombic efficiency of the battery is improved. In addition, when the negative electrode is further used in concert with the third porous film and the solid electrolyte membrane, the obtained battery (i.e. the battery of Example 5) can exhibit a Coulombic efficiency of about 97.5%.

Accordingly, due to the specific structure constituted by the porous conductive layer and non-conductive layer and the specific lithiophilic material of the conductive layer and non-conductive layer, the electrode of the disclosure can inhibit dendrite growth and mitigate the problem of battery swelling during battery charging and discharging. When the electrode of the disclosure is further used in concert with the third porous film and the solid electrolyte membrane, the technical bottleneck problems of the lithium battery can be overcome (i.e. inhibiting dendrite growth and improving the problem of electrode swelling). As a result, the goals of increasing the energy density and prolonging the lifespan of the battery can be achieved simultaneously.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An electrode, comprising:
    an active material layer, wherein the active material layer comprises copper, copper-containing alloy, lithium, lithium-containing alloy, or a combination thereof;
    a conductive layer disposed on a top surface of the active material layer, wherein the conductive layer comprises a first porous film and a conductive lithiophilic material, and the conductive lithiophilic material is within the first porous film and covers an inner surface of the first porous film; and
    a non-conductive layer, wherein the non-conductive layer comprises a second porous film and a non-conductive lithiophilic material, and the non-conductive lithiophilic material is within the second porous film and covers an inner surface of the second porous film, and wherein the conductive layer is disposed between the active layer and the non-conductive layer, and the binding energy ($\Delta G$) of the lithiophilic material with lithium is less than or equal to −2.6 eV.

2. The electrode as claimed in claim 1, wherein the resistivity of the conductive lithiophilic material is less than or equal to $9.9 \times 10^{-7}$ Ω·m.

3. The electrode as claimed in claim 1, wherein the conductive lithiophilic material is nickel, gold, platinum, tungsten, reduced graphene, or a combination thereof.

4. The electrode as claimed in claim 1, wherein the resistivity of the non-conductive lithiophilic material is greater than or equal to $1.0 \times 10^{-6}$ Ω·m.

5. The electrode as claimed in claim 1, wherein the non-conductive lithiophilic material is Si, $SiO_2$, $ZrO_2$, ZnO, $Li_3N$, $SnO_2$, BN, $V_2O_5$, or a combination thereof.

6. The electrode as claimed in claim 1, wherein the thickness of the conductive layer is from 1 μm to 500 μm, and the thickness of the non-conductive layer is from 1 μm to 500 μm.

7. The electrode as claimed in claim 1, wherein the first porous film and the second porous film independently comprise polyimide (PI), polyethylene (PE), polypropylene (PP), polyurethane (PU), polyvinyl alcohol (PVA), polydimethylsiloxane (PDMS), carbon fiber, or a combination thereof.

8. The electrode as claimed in claim 1, wherein the first porous film has a first porosity, and the second porous film has a second porosity, wherein the first porosity and the second porosity are independently from 70% to 99%.

9. The electrode as claimed in claim 1, wherein the first porous film has a first average pore size and the second porous film has a second average pore size, wherein the first average pore size and the second average pore size are independently from 5 μm to 100 μm.

10. The electrode as claimed in claim 1, wherein the thickness ratio of the conductive layer to the non-conductive layer is from 1:10 to 10:1.

11. The electrode as claimed in claim 1, further comprising a current-collecting layer, wherein the current-collecting layer is disposed on the bottom surface of the active material layer, and the active material layer is disposed between the current-collecting layer and the conductive layer.

12. A lithium-ion battery, comprising:
    a negative electrode, wherein the negative electrode is the electrode as claimed in claim 1;
    a solid electrolyte membrane; and
    a positive electrode, wherein the solid electrolyte membrane is disposed between the positive electrode and the negative electrode.

13. The lithium-ion battery as claimed in claim 12, wherein the solid electrolyte membrane consists of a composition, wherein the composition comprises:
    (a) 100 parts by weight of oxide-based solid-state inorganic electrolyte;
    (b) 20 to 70 parts by weight of $Li[R^2(-OR^1)_n-OR^2]Y$, wherein $R^1$ is $C_{1-4}$ alkylene group, $R^2$ $C_{1-4}$ alkyl group, n is from 2 to 100, and Y is $PF_6^-$, $BF_4^-$, $AsF_6^-$, $SbF_6^-$, $ClO_4^-$, $AlCl_4^-$, $GaCl_4^-$, $NO_3^-$, $C(SOCF_3)_3^-$, $N(SO_2CF_3)_2^-$, $SCN^-$, $O_3SCF_2CF_3^-$, $C_6F_5SO_3^-$, $O_2CCF_3^-$, $SO_3F^-$, $B(C_6H_5)_4^-$, or $CF_3SO_3^-$;
    (c) 1 to 10 parts by weight of nanoscale oxide; and
    (d) 1 to 20 parts by weight of binder.

14. The lithium-ion battery as claimed in claim 13, wherein a surface of the oxide-based solid-state inorganic electrolyte is covered by a hyper-branched polymer.

15. The lithium-ion battery as claimed in claim 12, further comprising a third porous film, wherein the third porous film is disposed between the solid electrolyte membrane and the negative electrode.

16. The lithium-ion battery as claimed in claim 12, wherein the third porous film comprises polydimethylsiloxane (PDMS), polytetrafluoroethylene (PTFE), polyvinylidene fluoride (PVDF), perfluoroalkoxy alkane (PFA), fluorinated ethylene propylene (FEP), poly(vinylidene fluoride-co-hexafluoropropylene) (PVDF-HFP), styrene-butadiene rubber (SBR), nitrile-butadiene rubber (NBR), or a combination thereof.

17. The lithium-ion battery as claimed in claim 12, wherein the third porous film has a third porosity, wherein the third porosity is from 50% to 70%, and the third porosity is less than the first porosity and the second porosity.

18. The lithium-ion battery as claimed in claim 12, wherein the third porous film has a third average pore size, wherein the third average pore size is from 1 μm to 5 μm, and the third average pore size is less than the first average pore size and the second average pore size.

19. The lithium-ion battery as claimed in claim 12, further comprising:
   a separator, wherein the separator is disposed between the solid electrolyte membrane and the positive electrode.

20. The lithium-ion battery as claimed in claim 12, further comprising:
   an electrolyte liquid, wherein the electrolyte liquid is disposed between the negative electrode and the positive electrode.

* * * * *